May 8, 1934. R. T. ECKLUND 1,958,189
APPARATUS FOR FORMING AND WRAPPING ARTICLES
Filed Sept. 19, 1927 15 Sheets-Sheet 6

Witness
William P. Riley

Inventor:
Rudolph T. Ecklund

May 8, 1934.     R. T. ECKLUND     1,958,189
APPARATUS FOR FORMING AND WRAPPING ARTICLES
Filed Sept. 19, 1927     15 Sheets-Sheet 7
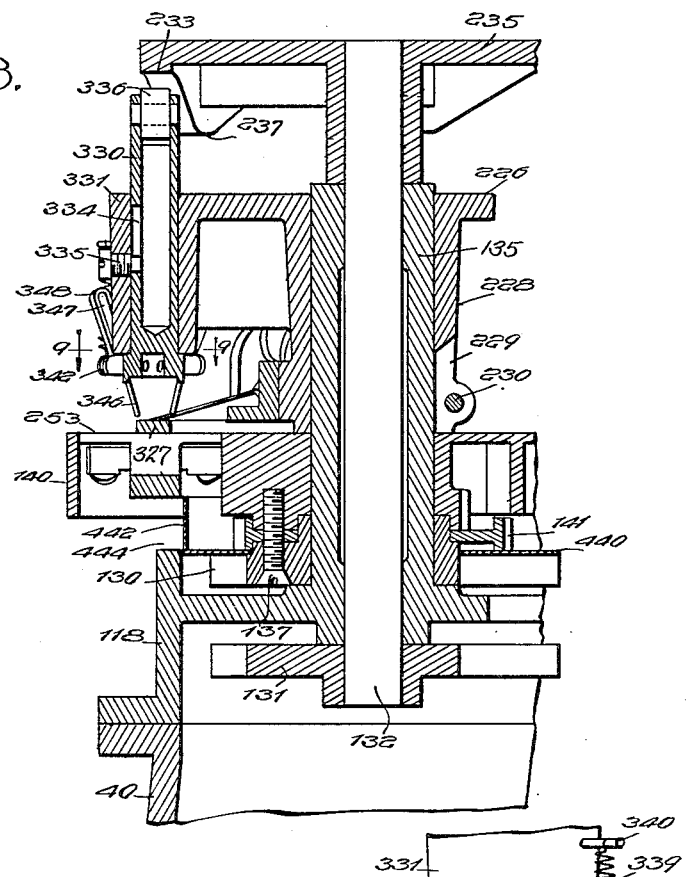
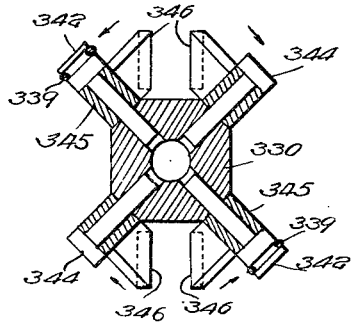
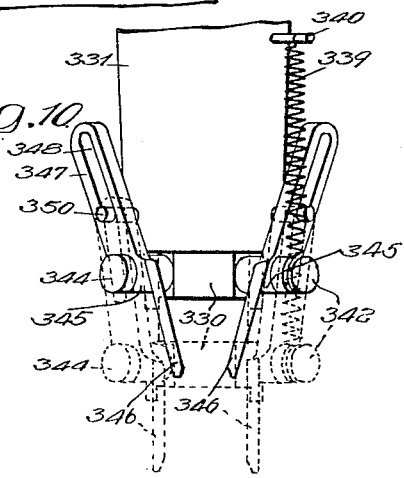
Witness:
William P. Kilroy
Inventor:
Rudolph T. Ecklund

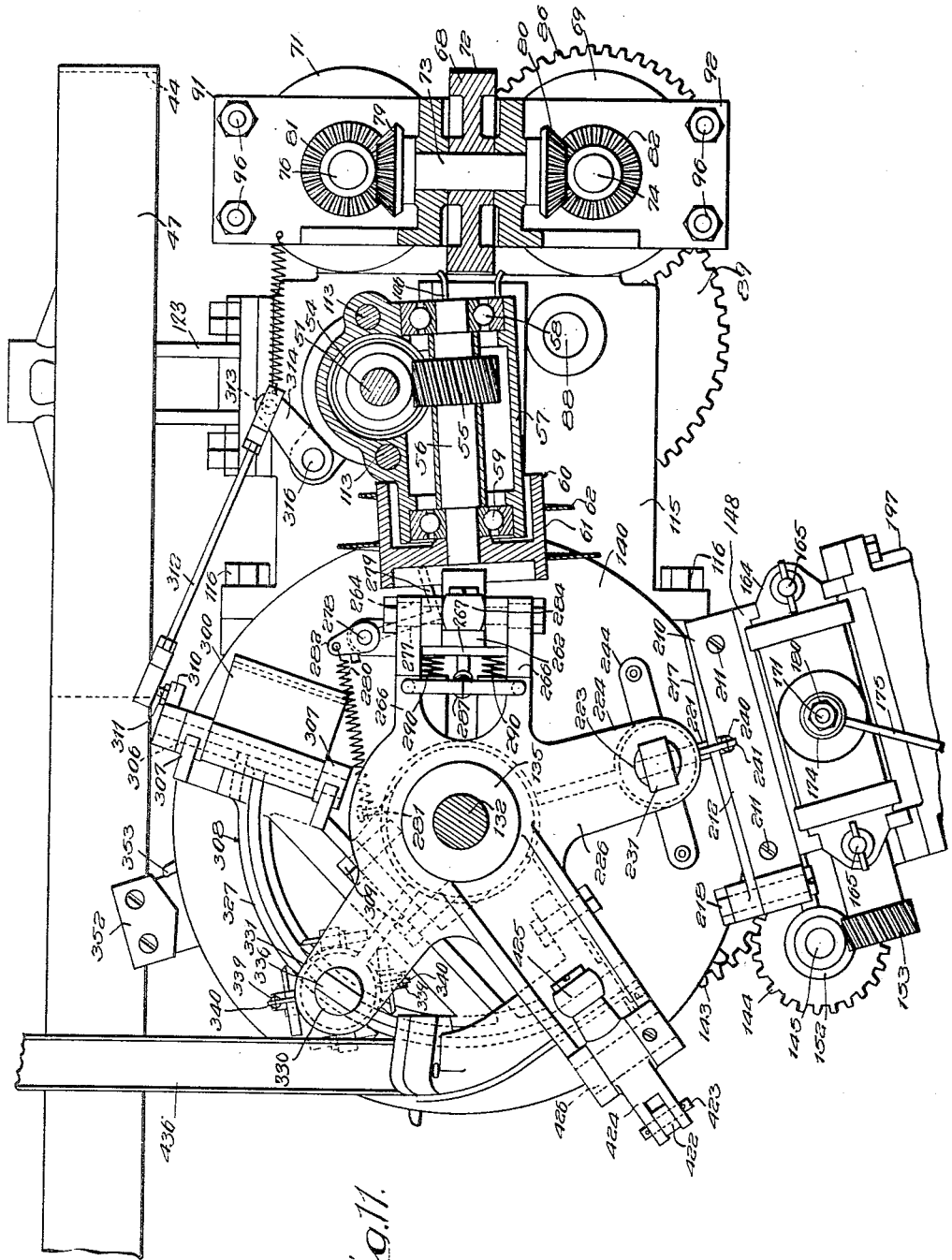

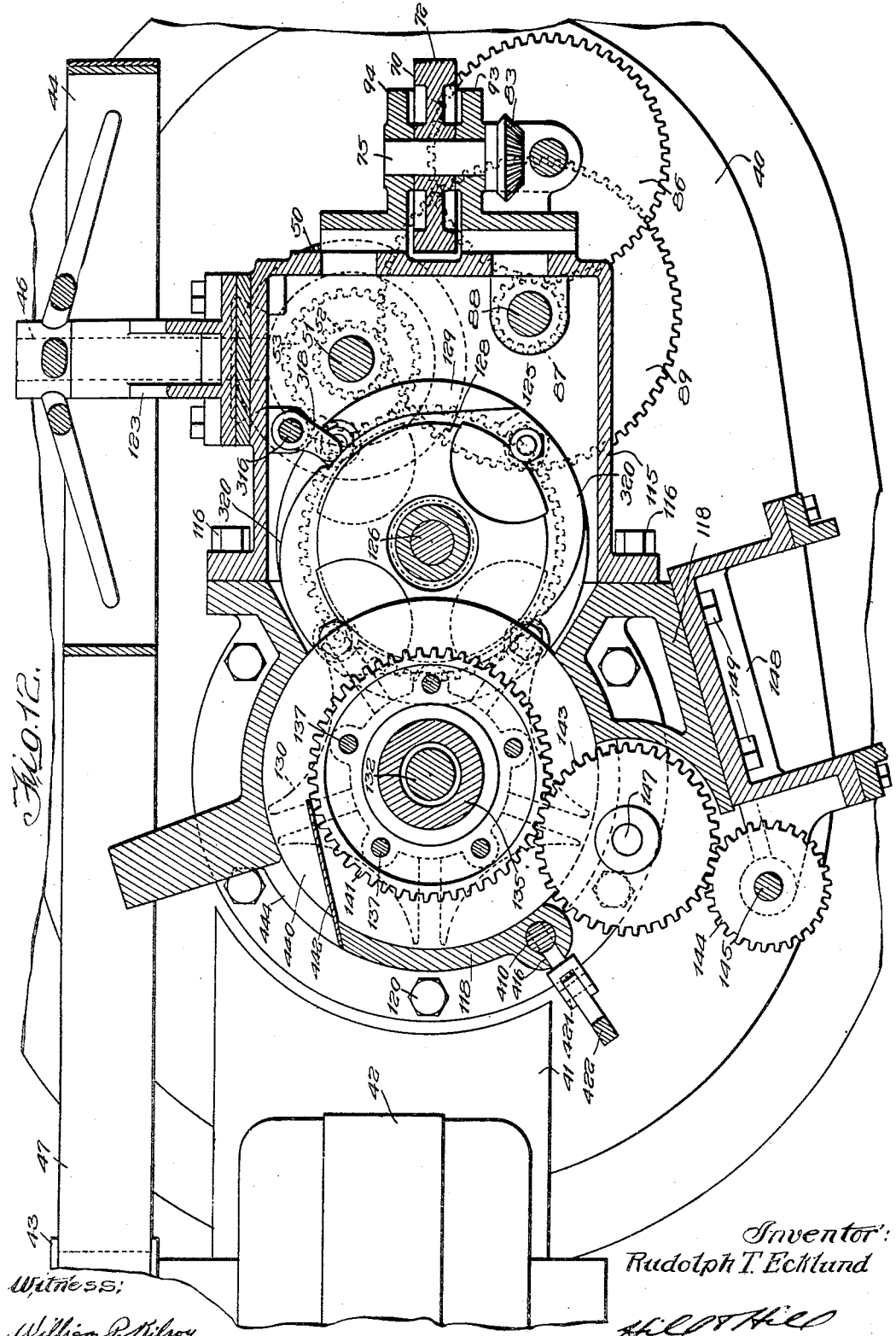

May 8, 1934.   R. T. ECKLUND   1,958,189
APPARATUS FOR FORMING AND WRAPPING ARTICLES
Filed Sept. 19, 1927   15 Sheets-Sheet 10
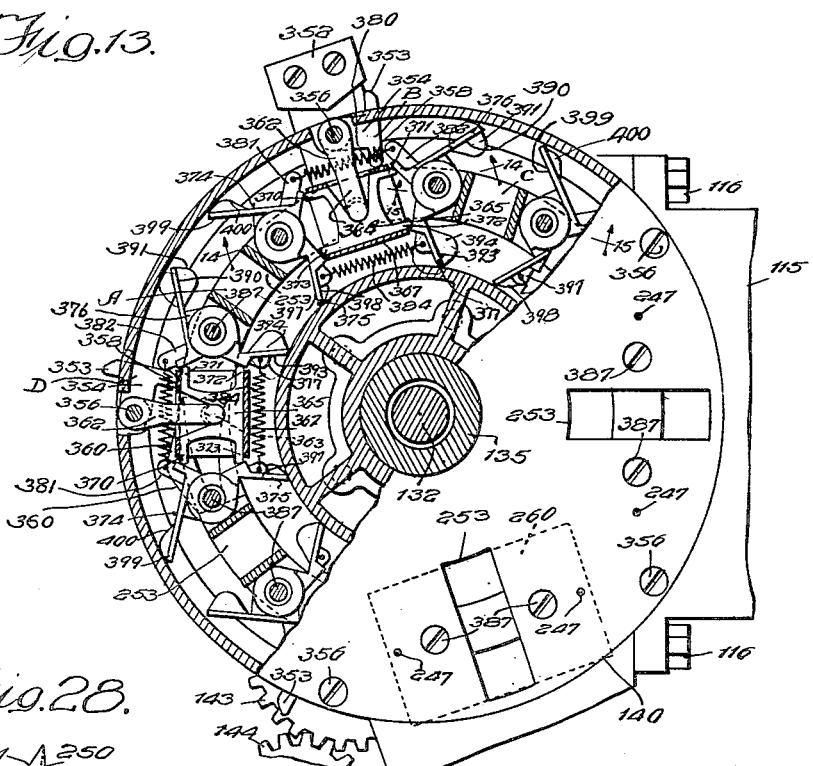
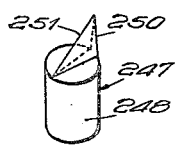
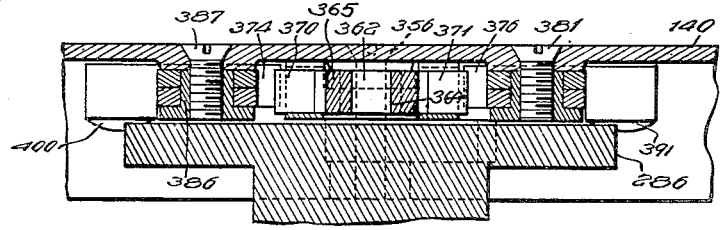

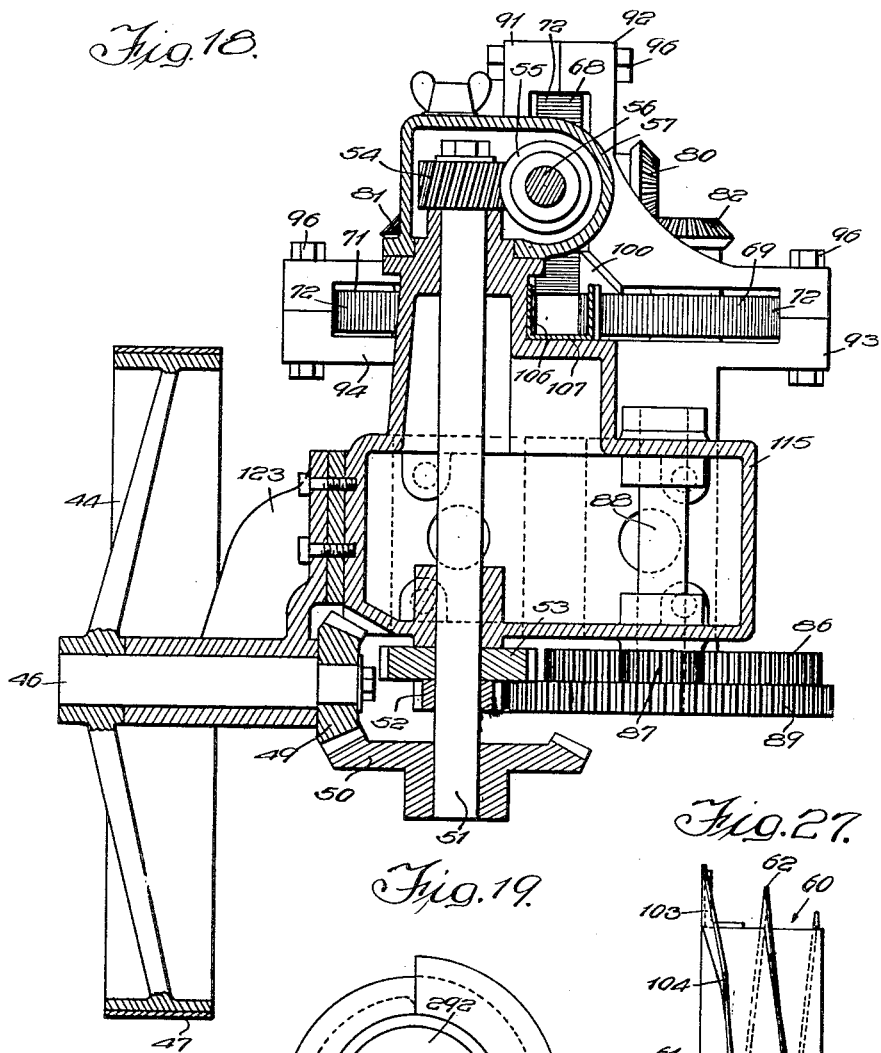

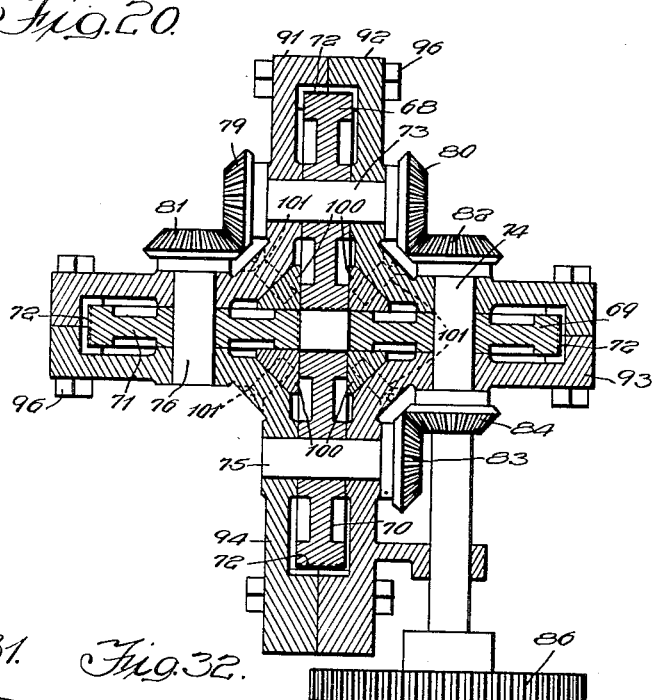

May 8, 1934.  R. T. ECKLUND  1,958,189
APPARATUS FOR FORMING AND WRAPPING ARTICLES
Filed Sept. 19, 1927  15 Sheets-Sheet 14
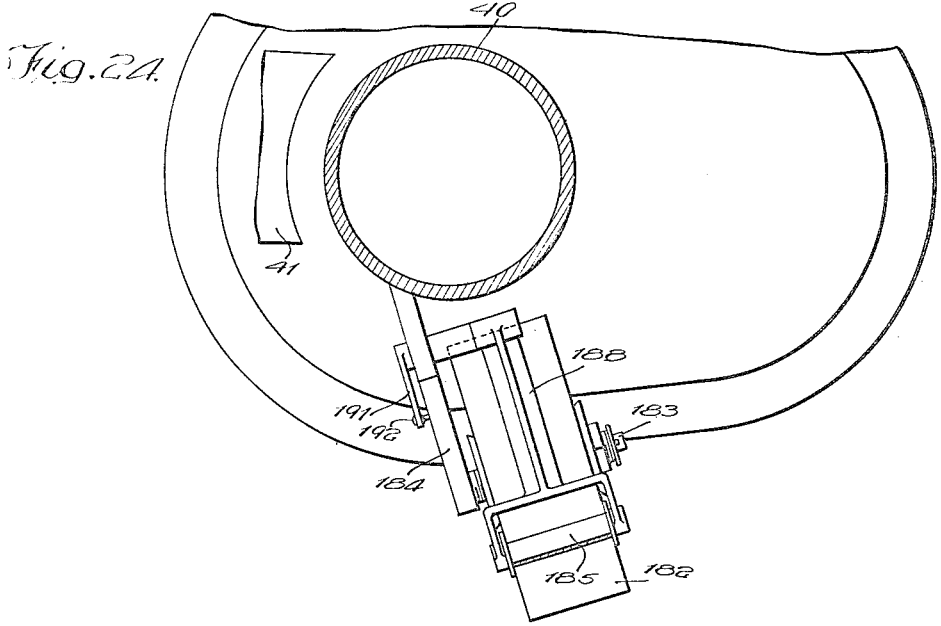
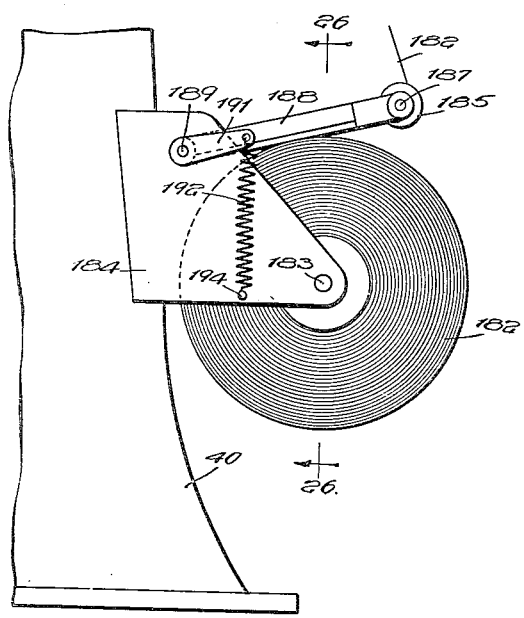
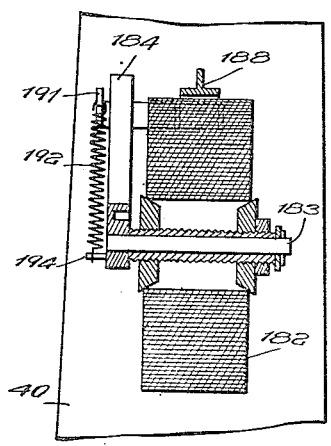
Witness:
William P. Kilroy
Inventor
Rudolph T. Ecklund May 8, 1934.　　　　　R. T. ECKLUND　　　　　1,958,189
APPARATUS FOR FORMING AND WRAPPING ARTICLES
Filed Sept. 19, 1927　　　15 Sheets-Sheet 15

Witness:
William P. Kilroy

Inventor
Rudolph T. Ecklund

Patented May 8, 1934

1,958,189

UNITED STATES PATENT OFFICE 1,958,189

APPARATUS FOR FORMING AND WRAPPING ARTICLES

Rudolph T. Ecklund, Chicago, Ill.

Application September 19, 1927, Serial No. 220,449

60 Claims. (Cl. 93—7)

My invention relates to apparatus for forming and wrapping articles and has among its other objects, the production of apparatus of the kind described that is compact, convenient, durable, efficient and satisfactory for use wherever found applicable.

Other objects of the invention are to provide improved apparatus for forming substantially identically shaped pieces of plastic material from a mass thereof; to provide improved apparatus for wrapping the substantially identically shaped pieces in sheets of paper, or the equivalent; to provide improved apparatus for forming a mass of plastic material into a bar of substantially constant cross section; to provide improved apparatus for cutting said bar into substantially identically shaped pieces; to provide improved apparatus for feeding said identically shaped pieces to the wrapping apparatus; to provide improved apparatus for feeding wrapping paper, or the equivalent, into a wrapping machine; to provide improved means for cutting the paper, or the equivalent into pieces of suitable size; to provide improved means for discharging wrapped articles from the wrapping machine; and to provide improved means for discharging imperfectly shaped pieces from a wrapping machine when such pieces can not be properly handled thereby.

One form of my invention is embodied in a machine adapted to form an irregularly shaped mass of candy into a bar of substantially constant cross-section, improved means being provided for cutting the bar into substantially identically shaped pieces which are continuously advanced to wrapping mechanism supplied with paper through mechanism which operates in synchronism with the candy advancing mechanism. In the preferred embodiment of the invention, the pieces of candy are simultaneously advanced and cut from the bar thereof by means which advances the leading piece of candy faster than the following pieces so that the following pieces will not interfere with the initial step of the wrapping operation. The paper in which the candy is to be wrapped is fed intermittently into the machine and is cut into pieces of suitable size by mechanism which operates in synchronism with the candy cutting and feeding means. The wrapping operation is performed in a plurality of steps by a series of improved mechanisms, the construction being such that when the apparatus is in operation, the several mechanisms operate continuously. Thus, when one mechanism performs the initial step of the wrapping operation on one piece of candy, another mechanism performs the second step thereof on another piece of candy, and still other mechanisms perform the remainder of the several steps of the wrapping operation on other pieces of candy. The wrapped candy is discharged from the machine by improved means which operates in synchronism with the wrapping mechanism and the candy cutting and advancing means.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 4a is a section taken on line 4a—4a of Fig. 4;

Fig. 4b is a section taken on line 4b—4b of Fig. 4;

Fig. 4c is a section taken on line 4c—4c of Fig. 4;

Fig. 8 is a section taken on line 8—8 of Fig. 1;

Fig. 9 is a section taken on line 9—9 of Fig. 8;

Fig. 11 is a section taken on line 11—11 of Fig. 2;

Fig. 12 is a section taken on line 12—12 of Fig. 2;

Fig. 13 is a section taken on line 13—13 of Fig. 4;

Fig. 14 is a section taken on line 14—14 of Fig. 13;

Fig. 15 is a section taken on line 15—15 of Fig. 13;

Fig. 16 is a section taken on line 16—16 of Fig. 1;

Fig. 18 is a section taken on line 18—18 of Fig. 1;

Fig. 19 is a section taken on line 19—19 of Fig. 1;

Fig. 20 is a section taken on line 20—20 of Fig. 1;

Fig. 21 is a plan view of a cam member and a portion of a bracket which forms part of the improved apparatus;

Fig. 22 is a section taken on line 22—22 of Fig. 21;

Fig. 23 is a section taken on line 23—23 of Fig. 21;

Fig. 24 is a section taken on line 24—24 of Fig. 2;

Fig. 25 is a side elevation of mechanism which forms part of the improved apparatus and is adapted to supply paper thereto;

Fig. 26 is a section taken on line 26—26 of Fig. 25;

Fig. 27 is an enlarged elevation of a combined cutting and conveying device which forms part of the improved apparatus;

Fig. 28 is a perspective view of one of a plurality of pins which form parts of my improved apparatus;

Fig. 29 is a plan view of one of a plurality of levers which form parts of the improved apparatus;

Fig. 30 is an end view of the lever shown in Fig. 29;

Fig. 31 is a plan view of a plurality of levers which form parts of the improved apparatus;

Fig. 32 is an end view of the lever shown in Fig. 31;

Figure 1:
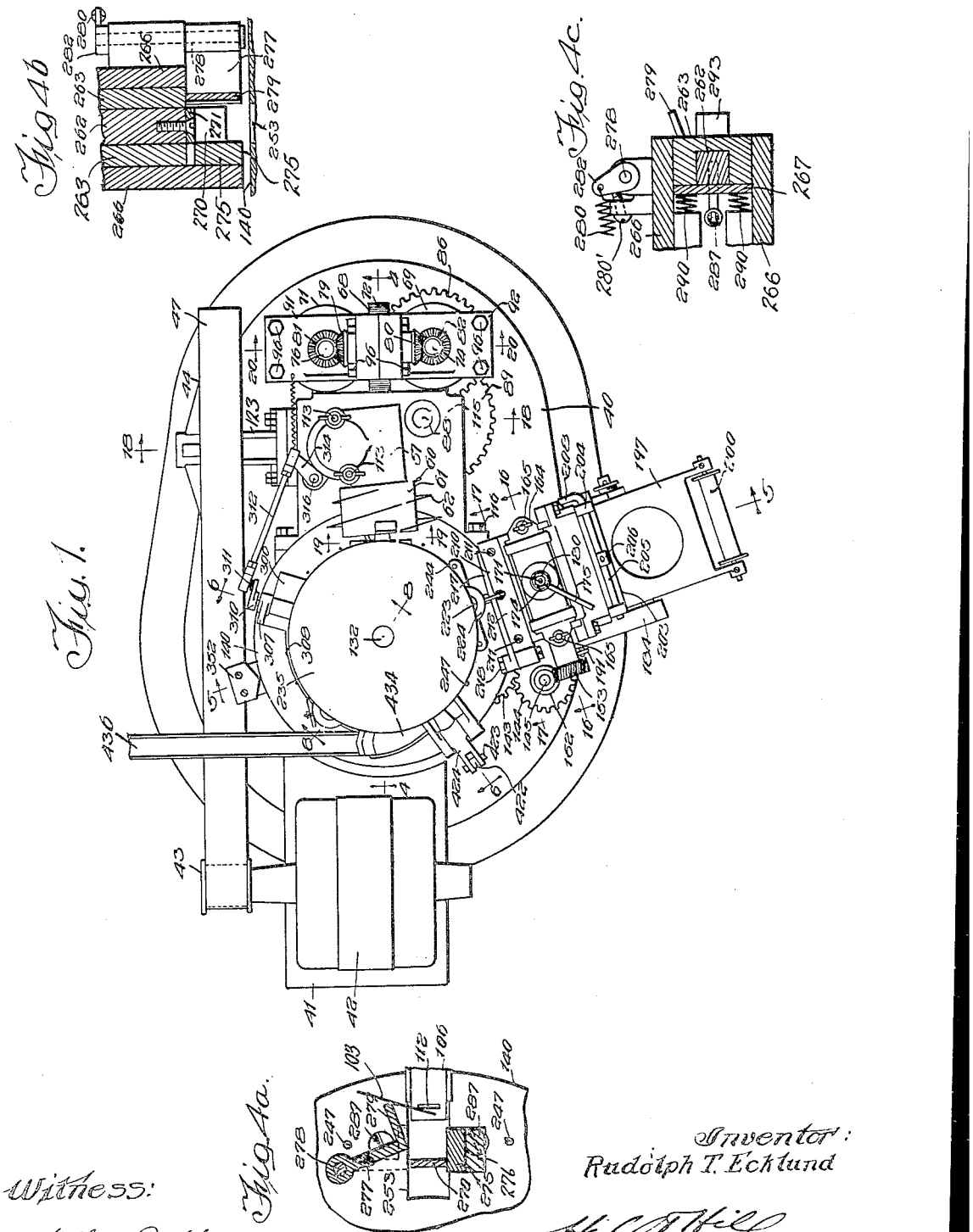
Fig. 1 is a plan view of apparatus which embodies the invention.

In the drawings, I have illustrated one form of my invention embodied in a machine which is particularly adapted to form an irregularly-shaped mass of candy into substantially identically shaped pieces thereof, the pieces of candy being subsequently wrapped in sheets of paper which are cut from a supply thereof by the machine. It should be understood, however, that the invention is limited to this use only to the extent indicated in the appended claims.

Referring to the drawings, and particularly Figs. 1 to 4, inclusive, for the present, it will be noted that the improved machine preferably comprises a frame member of pedestal 40 having an integral bracket 41 which supports an electrical motor 42, the shaft of the motor 42 being preferably provided with a pulley 43 which is in line with a pulley 44 keyed or otherwise secured to a shaft 46. A belt 47 is trained around the pulleys 43 and 44 and provides means whereby the motor 42 may drive the shaft 46. However, it is readily understood that any other suitable means may be provided for driving the shaft 46 if it is so desired.

As best shown in Fig. 18, a bevel gear 49 constrained to rotate with the shaft 46 meshes with a bevel gear 50 which is constrained to rotate with a vertically disposed shaft 51. Keyed or otherwise secured to the shaft 51 are spur gears 52 and 53 and a spiral gear 54, the spiral gear 54 being arranged to mesh with a spiral gear 55 which is keyed or otherwise secured to a horizontally disposed shaft 56 (see Fig. 11). Ball bearings 58 and 59 rotatably journal the shaft 56 in a housing member 57 which encloses the spiral gears 54 and 55 and the major portion of the shaft 56. One end of the shaft 56 projects from the housing member 57 and carries a combined cutting and conveying member which is designated generally by the reference character 60. The member 60 preferably comprises a cylindrical member 61, or the equivalent, upon which a blade 62 of more or less helical shape is mounted.

Figure 4:
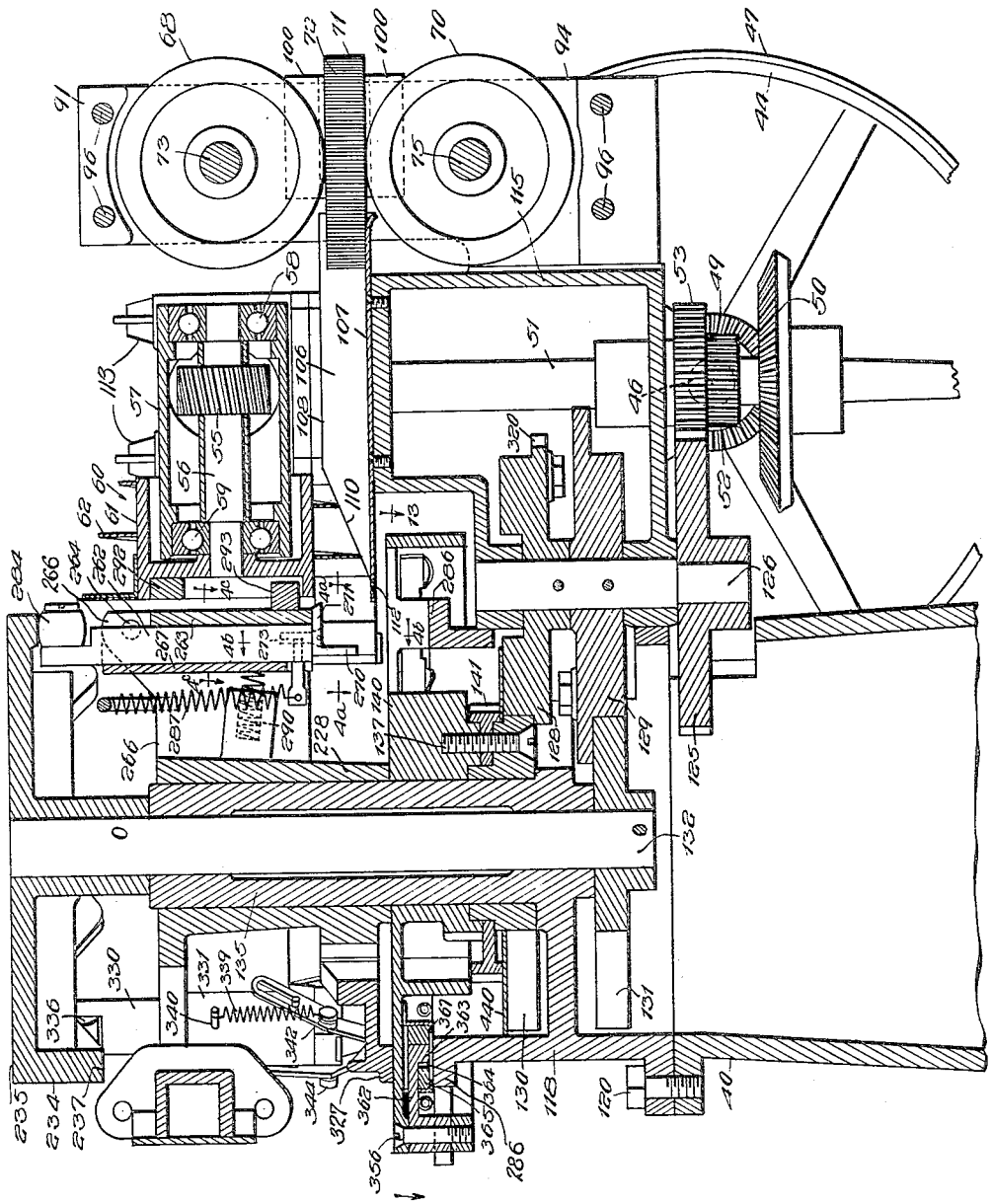
Fig. 4 is a section taken on line 4—4 of Fig. 1.

As best shown in Figs. 4 and 11, the combined cutting and conveying member 60 is aligned with means for feeding candy thereto, the member 60 being adapted to cut the candy into substantially identically shaped pieces and to advance these pieces to wrapping means described hereinafter. The feeding means preferably comprises a plurality of rolls 68, 69, 70 and 71, the cylindrical surfaces of the rolls being preferably corrugated as indicated at 72 (see Fig. 20). The rolls 68, 69, 70 and 71 are preferably constrained to rotate with shafts 73, 74, 75 and 76, respectively, and the shaft 73 has bevel gears 79 and 80 constrained to rotate with it. The bevel gears 79 and 80 mesh with bevel gears 81 and 82, respectively, which are keyed or otherwise secured to the shafts 76 and 74, respectively. Constrained to rotate with the shaft 75 is a bevel gear 83 which meshes with a bevel gear 84 constrained to rotate with the shaft 74, the shaft 74 being provided with a spur gear 86 which meshes with a pinion 87 fixed to a shaft 88. Disposed beneath the pinion 87 and also fixed to the shaft 88 is a gear 89 which meshes with the aforementioned gear 52 (see Figs. 12 and 13). The shafts 73, 74, 75, and 76 are rotatably journaled in a frame comprising bracket members 91, 92, 93, and 94, bolts 96, or the equivalent, being provided for rigidly securing the bracket members to each other (see Fig. 20).

It will be noted that the rolls 68, 69, 70 and 71 are arranged so that when the plastic material is fed thereto, the rolls will shape it into a bar of substantially rectangular cross section. To aid the rolls in so shaping the mass of plastic material, I preferably provide a plurality of guides or forming members, 100, which are rigidly secured by screws 101, or the equivalent, to the bracket members 91, 92, 93 and 94, the forming members 100 being preferably formed from a relatively hard steel. The gearing which operatively connects the shafts 73, 74, 75 and 76 to the shaft 46 is designed so that when the shaft 46 is rotated in a predetermined direction and a mass of plastic material, such as candy is delivered to the rolls 68, 69, 70 and 71, the rolls will shape the plastic material into a bar of substantially rectangular cross section and this bar will be advanced so that it will be engaged by the combined cutting and conveying member 60.

Referring now to Fig. 27, it will be noted that the blade 62 comprises substantially two turns and that a little more than one and three-fourths of these turns are substantially true helices. The lead being substantially uniform in these one and three-fourth turns and being of such length that an article or piece of candy engaged by the blade will be advanced thereby, during one revolution of the member 60, through a distance which is substantially equal to the distance the rolls 68, 69, 70 and 71 advance the plastic material or candy during a single revolution of the member 60. Not only is the blade 62 adapted to advance the bar of candy engaged by it but it is also adapted to cut the bar into pieces of substantially equal lengths. Thus, it will be noted that the one and three-fourth turns referred to above taper from the end which first engages the candy to a point where the lead of the blade increases suddenly, this portion of the blade being identified by the reference character 103 and being of substantially equal height throughout its length. This smallest end of the blade 62 first engages the bar of candy as it is advanced by the rolls 68, 69, 70 and 71 and cuts into it as it is advanced by the rolls. Then as the candy is advanced by the blade, the blade cuts deeper and deeper into the candy until it has severed a piece thereof from the bar whereupon this piece is engaged by the portion 103 of the blade 62 and is advanced at a higher rate of speed to separate it from the following piece of candy. To insure that the blade will completely sever each piece of candy from the bar, I preferably provide an outwardly projecting lug 104 upon the blade 62 adjacent the portion 103 thereof. The advantages of this construction are best understood from an inspection of Fig. 4 which illustrates the manner in which the rolls 68, 69, 70 and 71 are adapted to advance a bar of candy to the left and a substantially U-shaped guide 106 having a substantially flat bottom 107 upon which the candy travels when it is being advanced to the combined cutting and conveying member 60. Formed integral with the bottom member 107 are upwardly extending side flanges 108 which, at their forward ends, are cut away as indicated at 110 to provide clearance for the blade 62 (see Fig. 4). The bottom member 107 is preferably provided with an aperture or slot 112 through which the lug 104 passes when it completes the operation of severing a piece of candy from the bar thereof.

It may be mentioned at this point in the description that the housing member 57 is rigidly secured by bolts 113, or the equivalent, to a hollow bracket member 115 which is rigidly secured by bolts 116, or the equivalent, to a frame member 118, the frame member 118 being substantially a continuation of the pedestal 40 and being rigidly secured thereto by bolts 120, or the equivalent (see Figs. 4 and 11). The brackets 93 and 94 are rigidly secured by bolts 122 to the hollow bracket 115, (see Figs. 2 and 3). As best shown in Fig. 18, the shaft 46 is rotatably journaled in a bracket 123 which is rigidly secured to the hollow bracket 115 and the hollow bracket 115 rotatably journals the shafts 51 and 88.

Figure 5:
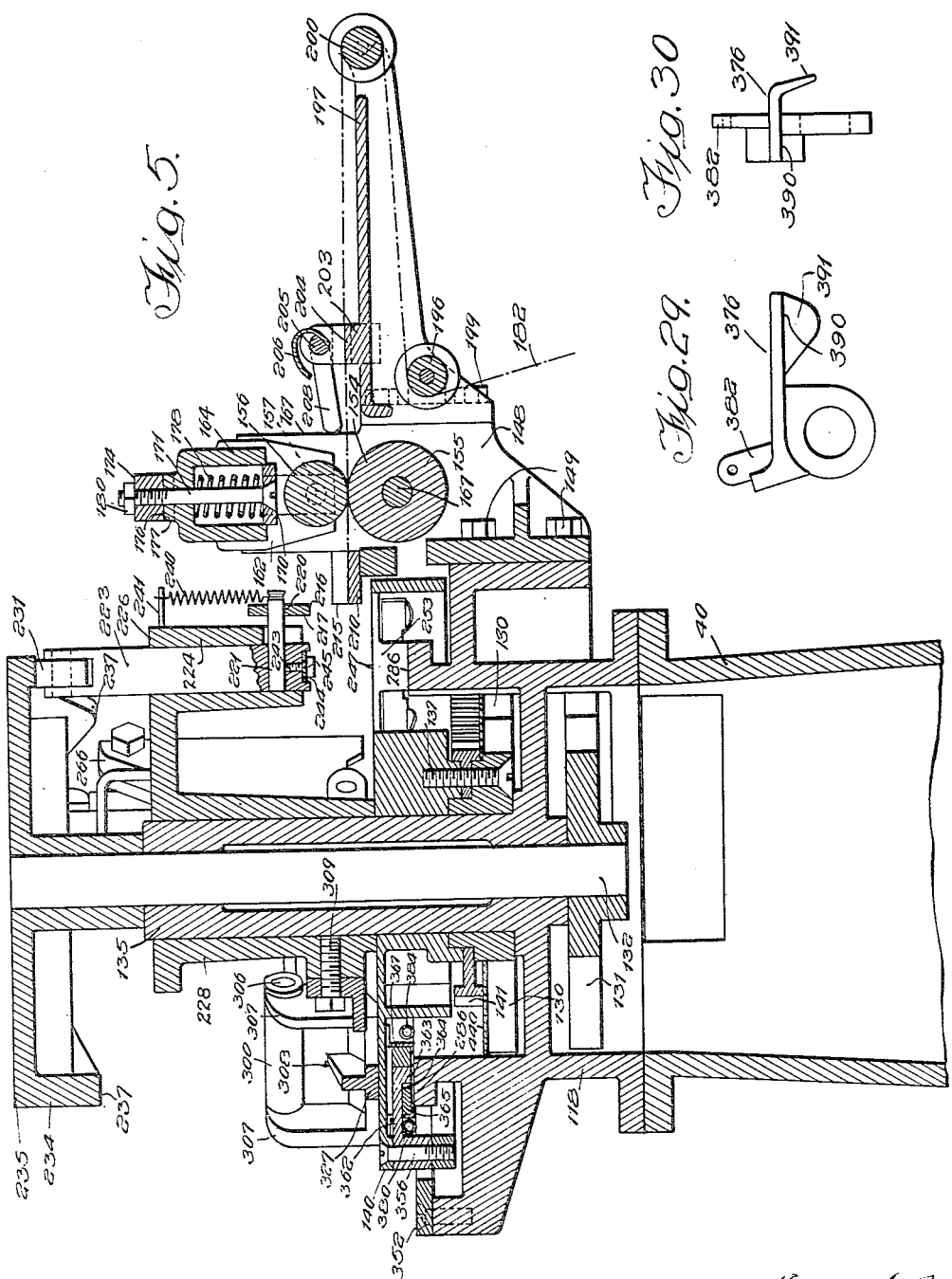
Fig. 5 is a section taken on line 5—5 of Fig. 1.

Referring now to Fig. 4, it will be noted that the gear 53 meshes with a gear 125 constrained to rotate with a vertically disposed shaft 126 which is rotatably journaled in the hollow bracket 115. Pinned, or otherwise secured to the shaft 126 are Geneva gear members 128 and 129 which co-operate with complementary Geneva gear members 130 and 131, respectively. The Geneva gear member 131 is pinned or otherwise secured to the lower end of a vertically disposed shaft 132 which has a cam member 235 pinned or otherwise secured to its upper end. The Geneva gear member 130 is rotatably journaled upon an upwardly extending hub 135 preferably formed integral with the frame member 118, and secured to the Geneva gear member 130 by screws 137 is a rotor, or table 140 and a spur gear 141. The gear 141 meshes with a gear 143 which meshes with a gear 144 fixed to a vertically disposed shaft 145 (see Fig. 12). The gear 143 is rotatably journaled upon a shaft 147 mounted in the frame member 118 and the shaft 145 is rotatably journaled in a bracket 148 which is secured by bolts 149, or the equivalent, to the frame member 118. Constrained to rotate with the shaft 145 is a spiral gear 152 meshing with a spiral gear 153 which is secured to a shaft 154 rotatably journaled in the bracket 148, (see Figs. 2, 11, and 16). A roll 155 constrained to rotate with the shaft 154 is engageable by a roll 156 provided with trunnions 157, the trunnions being rotatably journaled in bearing blocks 158 which are secured by screws 159 to a plate 160. As best shown in Figs. 5, 11, and 16, each of the bearing blocks 158 is slidably journaled by a pair of lugs 162 preferably formed integral with a bracket 164 which is rigidly secured by bolts 165, or the equivalent, to upwardly projecting lugs 167 formed integral with bracket 148. The plate 160 is carried by the head 170 of a vertically disposed bolt 171 which is slidably journaled in the bracket 164. A boss 174 carrying a lever 175 is rotatably journaled upon the bolt 171 and is provided with a cam surface 176 which engages a cam surface 177 formed upon the bracket 164, the arrangement being such that when the lever 175 is angularly displaced by the hand from the position wherein it is shown in Fig. 11, the cam surface 176 rides up upon the cam surface 177 and causes the roll 156 to be moved upward out of engagement with the roll 155. A compression spring 178 disposed around the bolt 171 and interposed between the plate 160 and the bracket 164 yieldingly holds the roll 156 in engagement with the roll 155 when the lever 175 is in the position wherein it is shown in Fig. 11. A nut 180 screw-threaded upon the upper end of the bolt 171 abuts against the upper surface of the boss 174.

Figure 2:
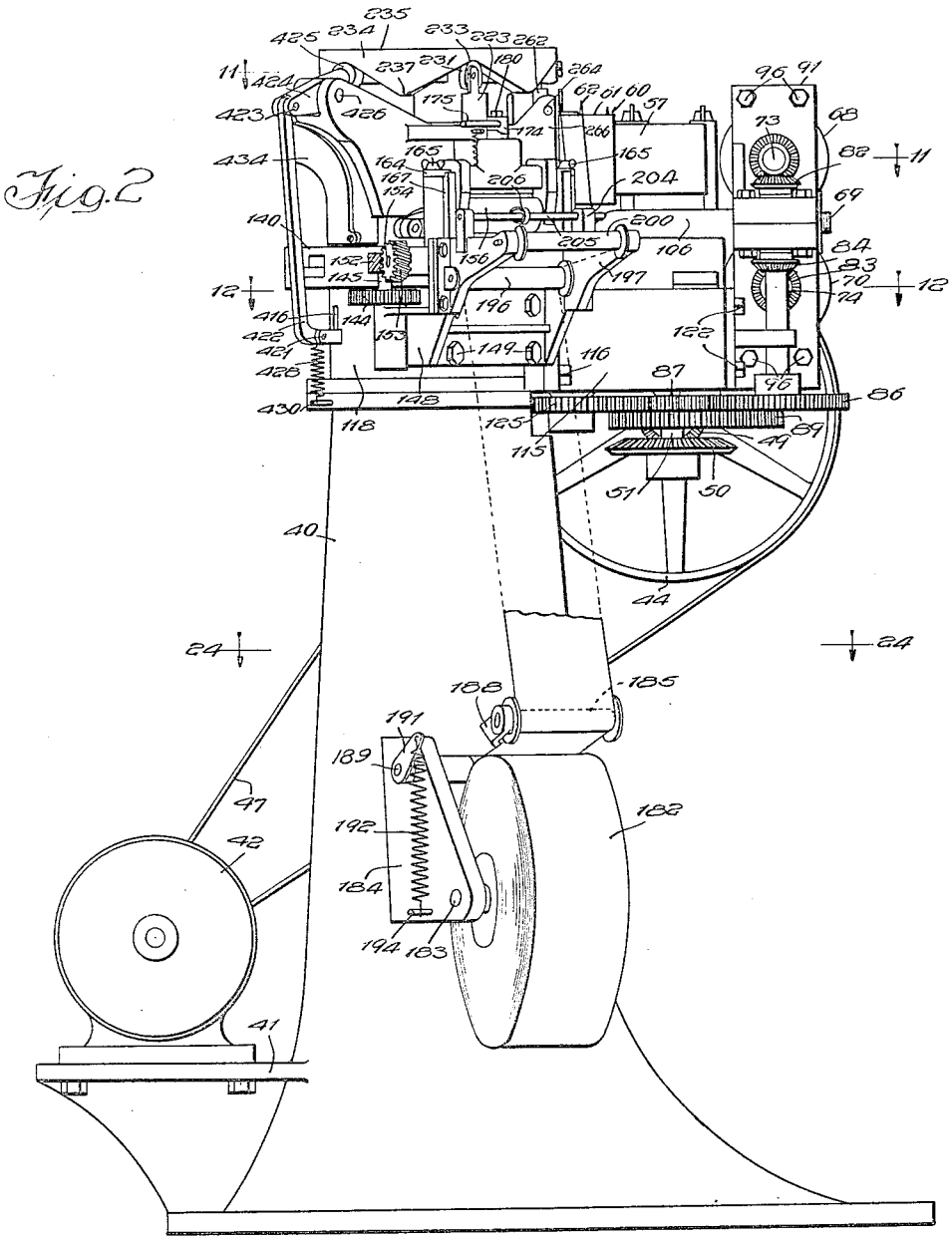
Fig. 2 is an elevation of the improved apparatus looking from one side thereof.
Figure 3:
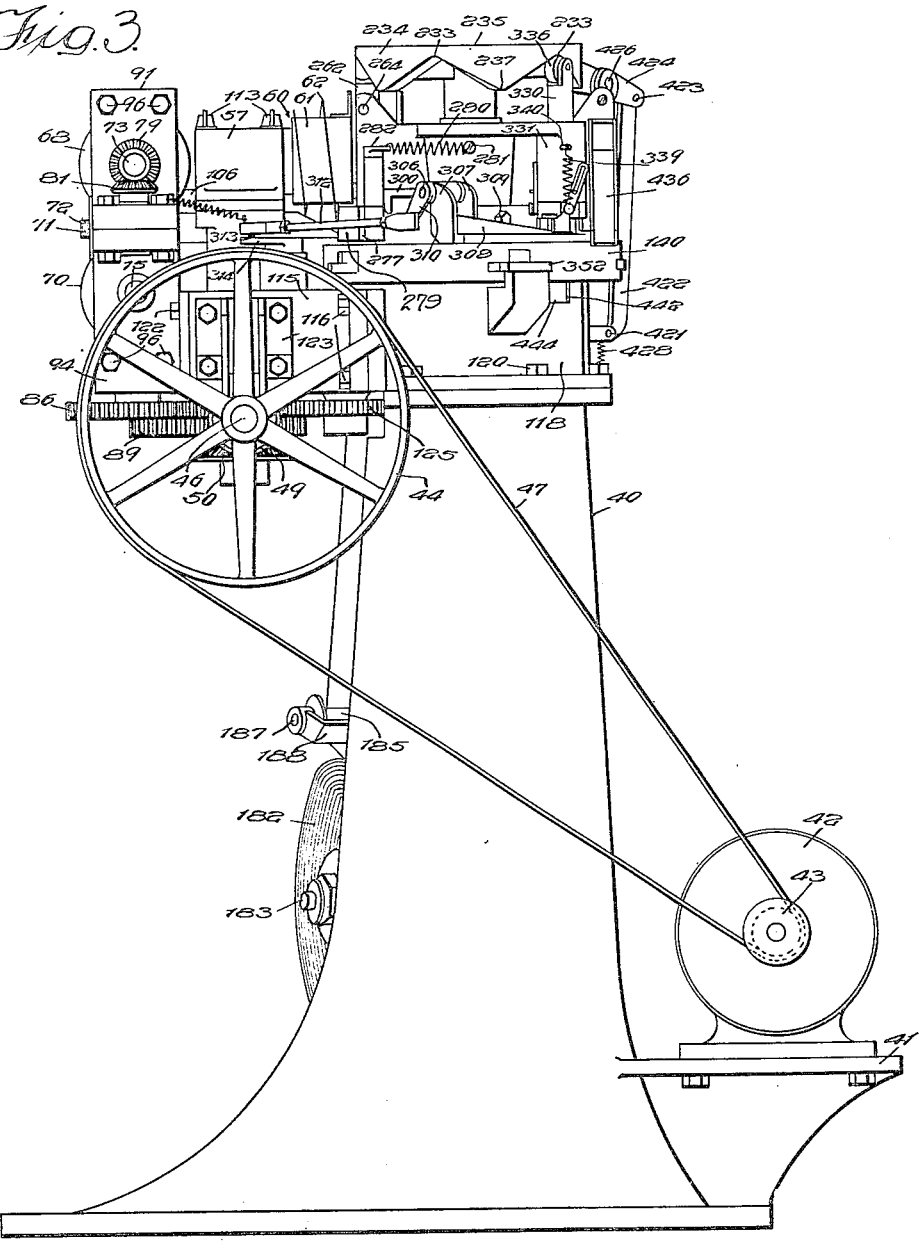
Fig. 3 is an elevation of the improved apparatus looking from the other side thereof.

The rolls 155 and 156 cooperate with each other to advance paper, or the equivalent, to the rotor or table 140, the paper being obtained from any suitable supply thereof, (see Figs. 2 and 5). In the preferred embodiment of the invention, a roll of paper 182 is carried by a shaft 183 which is rotatably journaled in the bracket 184 projecting from the pedestal 40, (see Figs. 2 and 25). The paper is drawn from the roll over a roller 185 mounted upon a shaft 187 which is carried by a bracket 188, the bracket 188 being secured to a shaft 189 which is rotatably journaled in the bracket 184. Secured to one end of the shaft 189 is a lever 191 and secured to the free end of the lever 191 is one end of a tension spring 192 which has its other end secured to a pin 194 projecting from the bracket 184. The construction is such that the spring 192 tends to angularly displace the bracket 188 in a clockwise direction (Fig. 25) to bring the bracket into frictional engagement with the paper 182 so that the paper will be tensioned when it is drawn from the roll. The paper passes from the roller 185 to a roller 196 rotatably mounted in a bracket 197 which is rigidly secured by bolts 199, or the equivalent, to the bracket 148, (see Figs. 2 and 5). The paper then passes to a roll 200 which is rotatably mounted in the bracket 197 and then to the rolls 155 and 156 over a boss 203 preferably formed integral with the bracket 197, (see Figs. 1 and 5). Formed integral with the boss 203 are two upwardly projecting lugs 204 which rotatably journal a shaft 205 carrying a cam member 206 and a lever 208 rigidly secured to one end of the shaft 205 may be manually operated to angularly displace the shaft 205 so that it will bring the cam 206 into engagement with the paper traveling over the boss 203 and clamp it thereto.

Figure 17:
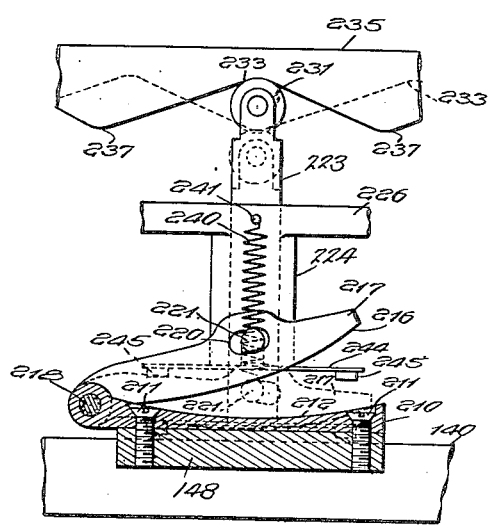
Fig. 17 is a section taken on line 17—17 of Fig. 1.
Figure 33:
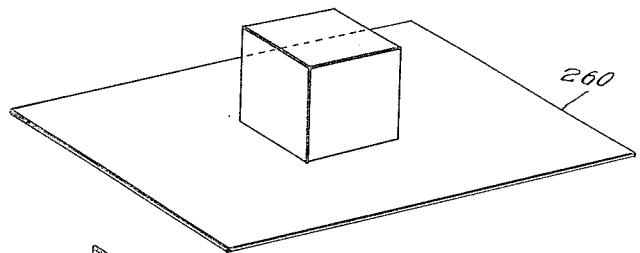
Fig. 33 is a perspective view which illustrates the manner in which my improved apparatus is adapted to place a piece of candy upon a sheet of paper which is to be wrapped around the candy.

Means is preferably provided for cutting the paper into relatively small pieces which are subsequently wrapped around the aforementioned pieces of candy cut from the bar thereof, (see Figs. 2, 5 and 11). This means preferably comprises a bar 210 rigidly secured by screws 211, or the equivalent, to the bracket 148, the bar 210 being provided with an arcuate surface 212 which is aligned with the rolls 155 and 156 in such manner that when the paper is advanced through the rolls it passes over the arcuate surface (see Fig. 17). The arcuate surface 212 terminates at one end in a relatively sharp edge 215 (see Fig. 5) adapted to cooperate with a relatively sharp arcuate edge 216 provided upon a lever 217 which is pivoted by a pin 218, or the equivalent to the bar 210. Projecting through a slot 220 formed in the lever 217 is a pin 221 which projects from a slide 223 journaled in a boss 224 which is preferably formed integral with a bracket 226. The bracket 226 preferably comprises a substantially central boss 228 which is slotted as at 229 so that a bolt 230 may be employed to clamp the bracket 226 upon the aforementioned hub 135 (see Fig. 8). Mounted in the upper end of the slide 223 is an anti-friction roller 231 engageable with a cam surface 233 formed upon a downwardly extending annular flange 234 which is preferably formed integral with a cam member 235, the cam member 235 being constrained to rotate with the shaft 132. (See Figs. 5 and 17.) For a purpose hereinafter set forth, the cam surface 233 is shaped to provide five portions 237 adapted to displace the anti-friction roller 231 and the slide 223 downward so that the pin 221 will cause the sharp edge 216 of the blade or lever 217 to pass by the sharp edge 215 provided upon the bar 210. Obviously, if the paper 182 has been fed over the bar 210 so as to project therefrom, the sharp edges 215 and 216 will cooperate with each other to shear or cut a piece of paper from the supply thereof advanced by the rolls 155 and 156. A tension spring 240 has one of its ends secured to the pin 221 and has its other end secured to a pin 241 which projects from the bracket 226, the arrangement being such that the spring 240 yieldingly holds the anti-friction roller 231 in engagement with the cam surface 233. Secured to the lower end of the slide 223 by a screw 243 is a relatively thin bar 244 which is preferably somewhat resilient. A pair of cup-shaped members 245 secured to the ends of the relatively thin bar 244 are adapted to engage the piece of paper cut from the supply thereof and are adapted to bring the piece of paper into a position wherein it rests upon the top surface of the table 140 and is impaled upon two of a plurality of pins 247 which project from the table. As best shown in Fig. 28, each pin 247 preferably comprises a shank 248 adapted to be seated in suitable recess formed in the rotor or table 140. At its upper end, each shank is preferably provided with a substantially triangular and relatively thin blade 250 which has a relatively sharp edge 251. The pins 247 are preferably positioned in the table or rotor 140 in such manner that the blade 250 projects above the upper surface of the table. As is best shown in Fig. 13, one pin of each pair of pins 247 is positioned to one side of one of a plurality of slots 253 provided in the rotor or table 140 and the other pin of this pair of pins is positioned to the other side of the slot, the pins being preferably so arranged that the blades 250 lie in a plane substantially normal to the radius of the associated slot 253 with the longitudinal axis of the shaft 132, the sharpened edge 251 being preferably positioned so that they point away from each other. Obviously, if a piece of paper (as indicated at the dotted lines at 260 in Fig. 13) has been impaled upon a pair of pins 247 and the paper is subsequently driven down into the slot 253, the sharpened edges 251 will either slit the opposed edges of the paper or will permit the paper to slip off of the blades 250. The purpose of this construction will presently appear.

As pointed out above, there are five portions 237 provided upon the cam surface 233 and this corresponds to the construction of the Geneva members 131 and 129 as these Geneva members are designed to rotate the shaft 132 intermittently. Thus, each time the Geneva member 129 is angularly displaced through an angle of 180 degrees, it angularly displaces the Geneva member 131 and likewise the cam 235 through an angle of 72 degrees. The construction is such that each complete revolution of the cam 235 is accomplished in five separate stages, the cam being brought to rest five times for each complete revolution thereof.

The construction of the Geneva members 128 and 130 is similar to the construction of the Geneva members 129 and 131 and the table 140 is rotated intermittently thereby, the construction being such that the table 140 comes to rest five times during each complete revolution thereof. However, the Geneva members are so arranged that the table 140 does not move simultaneously with the cam 235 but moves when the cam is at rest. The rotor or table 140 moves simultaneously with the intermittent feeding of paper or the equivalent. Thus, while each of the aforementioned slots 253, which are five in number provided in rotor 140 and which correspond to the five portions 237 provided upon the cam surface 233, are being brought 72 degrees therefrom to register with the slide 223, the rolls 155 and 156 cooperate to advance paper or the equivalent between the sharpened edges 215 and 216 provided upon the bar 210 and the blade 217 respectively, and over the rotor 140 to a desired distance. When each 72 degree movement of the rotor 140 is completed the cam 235 moves 72 degrees, thereby causing one of the portions 237 to drive the slide 223 downward and also permitting it to return.

At this point of specification relative to the accompanying drawings, I shall class it as a whole, a right-hand style machine, thus it requires a counter-clockwise direction of rotation of the rotor or table 140. In a left-hand style machine the rotor 140 would move in a clockwise direction (Figs. 1, 11 and 13). When the piece of paper has been impaled upon a pair of pins 247 the following angular displacement of the table 140 brings the piece of paper into registry with a slide 262 journaled in a bracket 263 which is pivoted by pins 264 in arms 266 preferably formed integral with the bracket 226. (See Figs. 4 and 11.) A plate 267 rigidly secured to the bracket 263 holds the slide 262 in place in the bracket (see Figs. 4, 4c, and 11).

The slide 262 is aligned with the combined cutting and conveying member 60 so that when a piece of candy is advanced by the blade 62, the piece of candy will engage a leg 270 which is preferably formed integral with an L-shaped member 271, the member 271 being secured by a screw 273 to the lower end of the slide 262 (see Fig. 4c). The leg 270 functions as a stop and preferably positions the piece of candy with respect to the aforementioned piece of paper impaled upon the pins 247 which have brought the paper into registry with the slide. As best shown in Figs. 4b and 4c, one of the arms 266 is provided with a downwardly extending lug 276 which is preferably formed integral with one of the arms 266. A block 275 is screwed or otherwise secured to lug 276 and which serves as a guide on one side of the piece of candy and is in alignment with one of the flanges 108 of the guide 106. In opposed relation to the lug 275, I preferably provide a lever 277 which is constrained to move with the shaft 278, which is journaled in a boss projecting from the other arm 266; the lever being provided with a lug 279 at its free end. At the other end of the shaft 278 is a lever 282 constrained to move with the shaft 278 and has secured to its free end, one end of a spring 280 which has its other end secured to a pin 281 projecting from the bracket 226, see Figs. 4a, 4b, 4c, and 3. When the lever 277 is brought to position as shown in Fig. 4a by the spring 280 to a suitable stop 280', the distance between the lug 279 and the guide block 275 and the condition thereby caused is such that it will permit free entrance by the leading piece of candy to a predetermined point just before the piece of candy is completely severed. As the cutting and conveying member 60 continues in its rotation, the portion of the blade identified as 103, as in Fig. 27, frictionally engages the somewhat rounded edge of the lug 279 of lever 277, starting at a point just after the lug 104 on blade 62, (see Fig. 27,) has passed thru the slot 112 in the bottom member 107 of the U-shaped guide 106, see Fig. 4; thus, pushing the lug 279 into a position relatively parallel to the guide block 275, as shown by dotted lines in Fig. 4a, and also pushing the severed piece of candy into position against the leg 270, and is thus finally shaped and is ready for slide 262 to push it downward. While the above operation is being performed the slot 253 in rotor 140 is being moved 72 degrees therefrom to register with the slide 262. An anti-friction roller 284 mounted upon the upper end of the slide 262 is engageable by the portions 237 provided upon the cam surface 233 and the cam portions 237 are designed so that when a piece of candy has been positioned against the leg 270 and between the lugs 275 and 279, the anti-friction roller 284 and the slide 262 will move downward so that the member 271 will drive the candy out of the space between the lugs 275 and 279 and into the slot 253 which is in registry with the slide. Of course, the piece of paper which is carried by the rotor or table 140 and is aligned with the slide 262 is also driven into the last mentioned slot 253 and comes to rest upon an annular flange 286 formed integral with the frame member 118 (see Fig. 4). When the paper and the candy are driven into the last mentioned slot 253, the paper is folded in the manner illustrated in Fig. 34. Immediately after the slide 262 has forced the candy and paper into the slot, the cam portion 237 permits a tension spring 287 to retract the slide 262 together with the member 271 but this upward displacement of the slide 262 and the member 271 is accompanied by angular displacement of them and the bracket 263 around the pivotal axis of the bracket 263 against the action of a plurality of compression springs 290. The means for angularly displacing the bracket 263, the slide 262 and the member 271 against the action of the compression springs 290 preferably comprises a cam member 292 mounted upon the combined cutting and conveying member 60 and engageable with a lug 293 rigidly secured to the bracket member 263. The cam 292 and the lug 293 are so constructed that when the slide 262 begins its upward stroke, the cam 292 engages the lug 293 and angularly displaces the bracket 263, the slide 262 and the member 271 in a clockwise direction (Figs. 4 and 11) around the coincident longitudinal axes of the pins 264. This arrangement prevents the member 271 from immediately engaging the next piece of candy which is being advanced to it by the member 60, the cam 292 being designed so that the leg 270 is brought into the position wherein it is shown in full lines in Fig. 4 in time to serve as a stop for the candy which is being advanced to it by the member 60.

Figure 7:
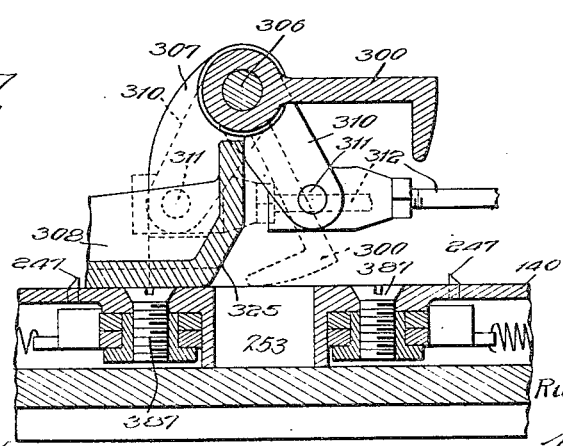
Fig. 7 is a section taken on line 7—7 of Fig. 6.
Figure 34:
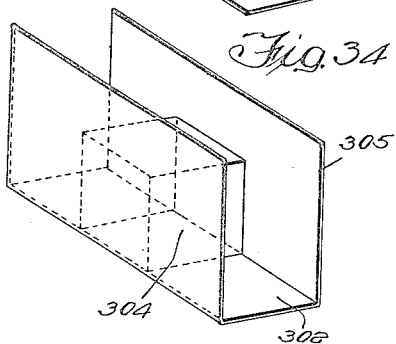
Fig. 34 is a perspective view which illustrates the first step of the wrapping operation.
Figure 35:
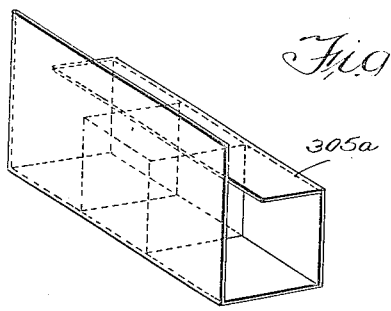
Fig. 35 is a perspective view which illustrates the second step of the wrapping operation.
Figure 36:
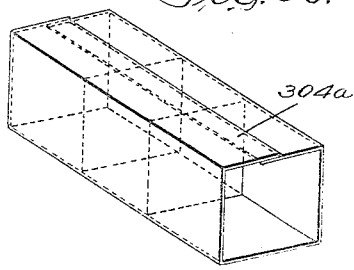
Fig. 36 is a perspective view which illustrates the third step of the wrapping operation.

When a piece of candy and a piece of paper have been positioned in a slot 253 aligned for the moment with the slide 262, the Geneva members 128 and 130 function and angularly displace the table 140 in a counter-clockwise direction (Figs. 4, 5, and 7) through an angle of 72 degrees to bring the candy and paper into a position wherein a member or lever 300 may be actuated to fold one portion of the paper over the candy. Thus, as illustrated in Fig. 34 when the slide 262 functions to drive the piece of candy into one of the slots 253, the bottom surface of the candy rests upon a substantially rectangular portion 302 formed in the paper and opposed sides of the candy are engaged by upwardly extending portions 304 and 305 of the paper. The member or lever 300 is adapted to fold the portion 305 in the manner illustrated in Fig. 35 so as to bring a smaller portion 305a thereof into engagement with the upper surface of the candy, the candy being, in this instance, in the form of a cube. As best shown in Fig. 7, the member or lever 300 is fixed to a pin or shaft 306 which is journaled in spaced lugs 307 provided upon a bracket member 308 which is secured by bolts 309, or the equivalent, to the bracket 226 (see Figs. 5 and 11). Fixed to one end of the shaft 306 is a lever 310 which is connected by a ball and socket joint 311 to one end of a link 312 which has its other end connected by a ball and socket joint 313 to the free end of a lever 314, the lever 314 being pinned or otherwise secured to a vertically disposed shaft 316 which is rotatably journaled in the hollow bracket 115 (see Figs. 1 and 11). Secured to the lower end of the shaft 316 is a lever 318, the free end of which is engageable by diametrically disposed cam surfaces 320 formed upon the Geneva member 128 when the machine is in operation and the table 140 advances one of the slots 253, together with a piece of candy and a piece of paper toward the member or lever 300, the lever 318 is engaged by one of the cam surfaces 320 in such manner that when each of the slots 253 passes underneath the member or lever 300, and comes to rest, the lever is angularly displaced in a clock-wise direction (Figs. 7, 11 and 12 respectively) and engages the portion 305 of the paper to bend the smaller portion 305a into the position wherein it is shown in Fig. 35. When the member or lever 300 is brought to position as shown in dotted lines in Fig. 7, it stays at rest until the table 140 again advances the slot 253 and the paper and candy. The portion 304 of the paper will then be engaged by a cam surface 325 formed upon the bracket 308 and turned down to provide a smaller portion or flap 304a which will overlap the portion 305a (see Fig. 36). During the following travel of the table 140 the flaps or portions 304a and 305a will be retained in their folded positions by an arcuate bar 327 which is preferably formed integral with the bracket 308 (see Figs. 5 and 11).

Figure 10:
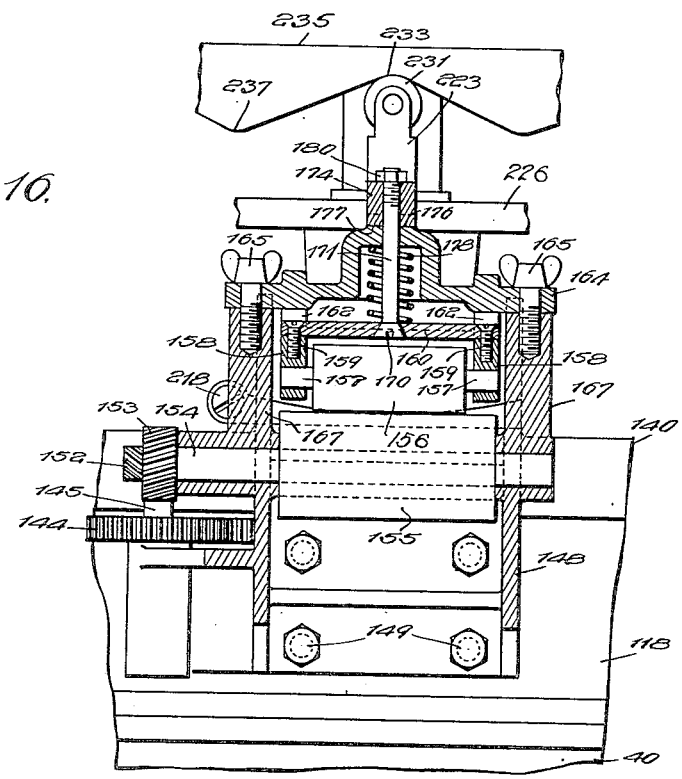
Fig. 10 is an enlarged side elevation of paper folding mechanism which forms a part of the improved apparatus.

Referring to Fig. 11, it will be readily understood that each slot 253 comes to rest beneath a slide 330 (see also Figs. 8, 9 and 10). The slide 330 is journaled in a boss 331 preferably formed integral with the bracket 226, the slide being provided with a slot 334 which is engaged by a screw 335 screw-threaded into the boss 331. The construction is such that the screw 335 prevents angular displacement of the slide 330 around its longitudinal axis. The anti-friction roller 336 is rotatably mounted in the upper end of the slide 330 and is engageable by the cam surface 233 so that the portions 237 may drive the slide 330 downward against the action of a plurality of tension springs 339 when the cam member 235 is angularly displaced. Each tension spring 339 has one of its ends secured to one of a plurality of pins 340 projecting from the boss 331 and has its other end secured to one of a plurality of pins 342 projecting from the slide 330. Referring to Fig. 9, it will be noted that the longitudinal axes of the pins 342 are coincident with each other and that a plurality of pins 344 are disposed substantially at right angles to the pins 342. The pins 342 project from the slide 330 and pivoted upon the pins 342 and 344 are a plurality of levers 345. Each of the levers 345 comprises a downwardly extending finger 346 and an upwardly extending portion 347 which is provided with an elongated slot 348, each slot 348 being engaged by one of a plurality of pins 350 which projects from the boss 331.

Figure 37:
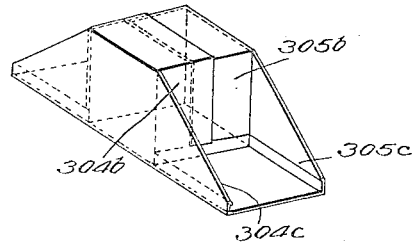
Fig. 37 is a perspective view which illustrates the fourth step of the wrapping machine.

When the slide 330 is driven downward by one of the portions 237, the levers 345 move with the slide and are also angularly displaced around their pivotal axes. Thus, the fingers 346 are displaced in the directions indicated by the arrows shown in Fig. 9, this displacement being caused by the pins 350 which engage the slots 348. Assuming that a piece of candy is wrapped in a piece of paper in the manner illustrated in Fig. 36 and that it is positioned in a slot 253 disposed beneath the slide 330 it is readily understood that when the slide 330 moves downward, the fingers 346 will engage the outer ends of the flap portions 304a and 305a and fold them into the positions wherein they are shown in Fig. 37 so that still smaller flap portions 304b and 305b engage opposed sides or ends of the piece of candy and so that substantially triangular portions 304c and 305c formed from the portions 304 and 305 project from the candy. It will be noted that the portion 302 of the paper has not been folded in any manner up to this stage of the wrapping operation.

Now when the table 140 is again angularly displaced to bring an object such as shown in Fig. 37 out of registry with the slide 330, a cam 352 engages a lug 353 provided upon a lever 354 which is pivoted by a pin 356, or the equivalent, to the table 140 (see Fig. 13). It will be noted that there are the same number of levers 354 as there are of slots 253 and that each lever 354 is disposed between and associated with two of the slots 253. In Fig. 13, the slot 253 which is also identified by the reference character A is in registry with the slide 330 and the lever 354 which is also identified by the reference character B is associated with that slot 253 which is also identified by the reference character A. In addition, the lever 354 which is also identified by the reference character B is also associated with a slot 253 which is further identified by the reference character C in Fig. 13. It will be noted that when the slot 253 marked A is moved out of registry with the slide 330, the slot 253 marked C will be moved into registry with the slide.

Formed integral with each lever 354 is a lug 358 engageable with a cam 360 for a purpose hereinafter described (see Figs. 13, 21, and 22). Also formed integral with each lever 354 is a lever 362 having a downwardly extending cylindrical lug 363 engageable with an aperture 364 provided in the slide 365, there being the same number of slides 365 as there are slots 253 and levers 354. Each slide 365 is journaled in a substantially U-shaped guide member 367 secured to the bottom surface of the table 140. As best shown in Fig. 13, each slide 365 comprises outwardly extending fingers 370, 371, 372, and 373. The fingers 370 and 373 are engageable with levers 374 and 375, respectively, and the fingers 371 and 372 are engageable with levers 376 and 377, respectively. To facilitate this disclosure of my invention, it is best to point out that the levers 374 and 375 associated with the slot 253 marked A in Fig. 13 are engageable by the fingers 370 and 373 provided upon that slide 365 which is disposed intermediate the slots 253 marked A and C in Fig. 13. And the levers 376 and 377 are associated with the slot 253 marked C in Fig. 13 and are engageable by the fingers 371 and 372, respectively, of the slide 365 disposed intermediate the slots 253 marked A and C in Fig. 13. It will be noted that each lever 374 is connected to the following lever 376 through a tension spring 380, the levers 374 and 376 being provided with lugs 381 and 382 to which the ends of the spring are attached. Each lever 375 is operatively connected to the following lever 377 through a tension spring 384 which has its ends secured to the levers.

Referring to Figs. 14 and 15, it will be noted that each lever 374 and its associated lever 375 is pivotally mounted upon one of a plurality of hubs 386 which are rigidly secured by screws 387, or the equivalent, to the table 140. In a like manner, each of the levers 376 and its associated lever 377 is pivoted upon one of a plurality of hubs 386. In Figs. 29 and 30, I have shown two views of one of the levers 376 and in Figs. 31 and 32, I have shown two views of one of the levers 375. It will be noted that each lever 376 comprises a substantially flat vertical surface 390 and that it is provided with a rearwardly, (in relation to the direction of the rotation of the rotor 140) extending lug 391 which is inclined more or less to the horizontal. The levers 377 resemble the levers 376 in construction but the dimensions of portions thereof are somewhat different. It will be noted that each lever 377 is provided with a substantially flat vertical surface 393 and a rearwardly (in relation to the direction of the rotation of the rotor 140) extending lug 394, the flat surface 393 and the lugs 394 corresponding to the aforementioned flat surface 390 and the aforementioned lug 391. Each lever 375 is preferably formed with a flat vertical surface 397 and a rearwardly (in relation to the direction of the rotation of the rotor 140) extending lug 398, which rearwardly extending lug is preferably inclined more or less to the horizontal. The levers 374 resemble the levers 375 in construction but the dimensions of certain portions thereof are different. However, the levers 374 are provided with substantially flat vertically disposed surfaces 399 and rearwardly (in relation to the direction of the rotation of the rotor 140) extending lugs 400 which correspond to the aforementioned surface 397 and the aforementioned lugs 398, respectively.

Figure 38:
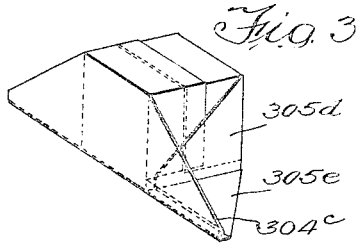
Figs. 38, 39 and 40 illustrate the fifth and final steps of the wrapping operation.

As set forth above, movement of the table 140 in a counter clockwise direction to angularly displace the slot 253, which is in registry with the slide 330 will cause the lug 353 of that lever 354 which is disposed between the slots 253 marked A and C in Fig. 13 to engage the cam 352 (refer to Fig. 13). Such engagement of the cam 352 by the lug 353 causes angular displacement of the associated lever 362 in a clockwise direction around the associated pin 356 and the associated slide 365 advances toward the slot 253 marked A in Fig. 13 so that the levers 374 and 375 are angularly displaced through the action of the fingers 370 and 373, respectively. Now if it is assumed that an object similar to the partly wrapped piece of candy shown in Fig. 37 is disposed in the slot 253 marked A in Fig. 13, it is readily understood that the flat surface 399 and 397 of the levers 374 and 375, respectively, will engage the triangular flaps 305c illustrated in Fig. 37 and fold these flaps back against the candy into positions wherein they are shown in Fig. 38. Thus, each flap 305c forms two smaller flaps 305d and 305e, the flaps 305d being pressed against the aforementioned flaps 304b and 305b and the flaps 305e being pressed against the aforementioned portion 302 of the sheet of paper in which the candy is being wrapped. The lugs 400 and 398 tend to bend the flaps 305e and the end parts of the portion 302 downwardly to facilitate the remainder of the wrapping operation.

Figure 39:
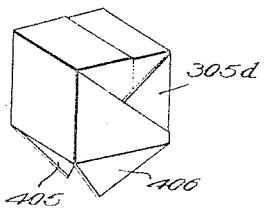

After the levers 374 and 375 have performed their functions, the associated lug 353 passes beyond the cam 352 and the springs 380 and 384 restore them to their normal positions, the construction being such that the associated lever 362, the associated lever 354 and the slide 365 are also returned to their normal positions. Then as the table 140 continues to rotate, the lug 358 of the lever 354 which is also identified by the reference character D immediately in front of the slot 253 marked A that is being displaced from registry with the slide 330 engages the aforementioned cam 360 and the associated lever 362 is rotated in a counter clockwise direction (Fig. 13) around its pivotal axis so that the associated slide 365 causes its fingers 371 and 372 to angularly displace the associated levers 376 and 377. The flat surfaces 390 and 393 of these levers 376 and 377, respectively, then engage the triangular flat portions 304c in Figs. 37 and 38 and bend them back in the manner illustrated in Fig. 39 so that they overlap the aforementioned triangular flat portions 305d and also overlap the triangular flap portions 305e shown in Fig. 38. The lugs 391 and 394 provided upon the levers 376 and 377, respectively, push the triangular flap portions 305e together with the portions of the flap portions 304c which overlap them into the positions wherein they are shown in Fig. 39 to provide the triangular flaps 405 and 406 shown in Fig. 39. The lug 358 then passes beyond the cam 360 and the associated slide 365 and the associated levers 376 and 377 return to their normal positions.

Figure 6:
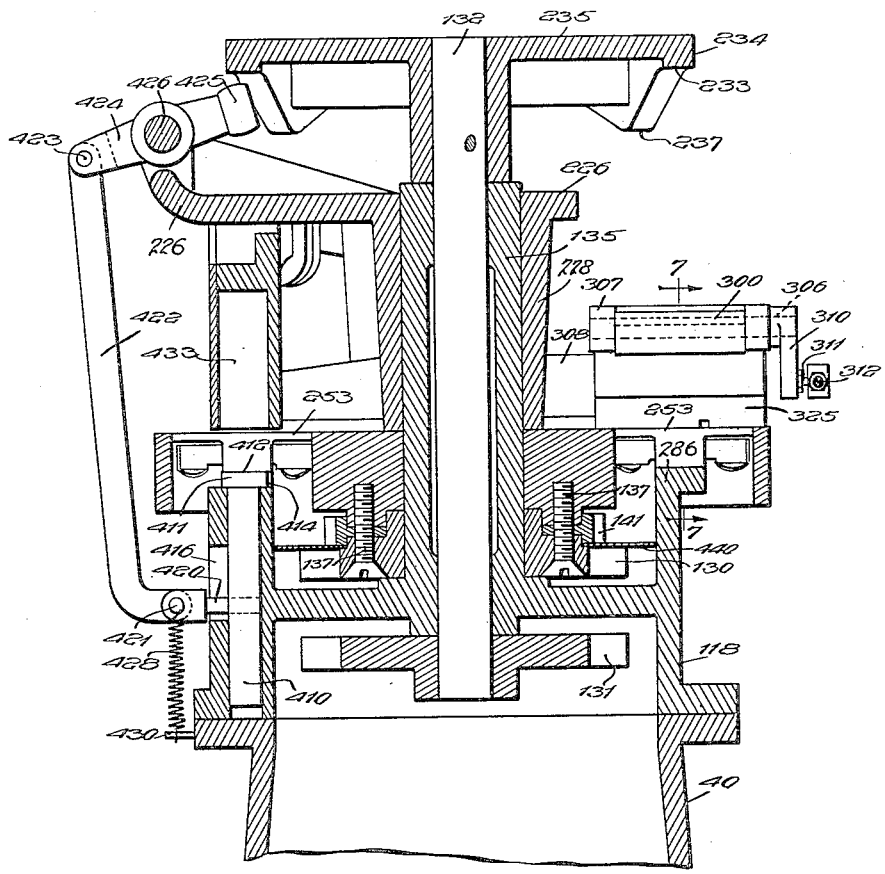
Fig. 6 is a section taken on line 6—6 of Fig. 1.
Figure 40:
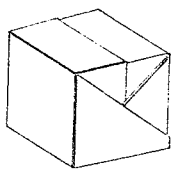

Referring now to Figs. 21, 22 and 23, it will be noted that the annular flange 286, which forms a part of the frame member 118, is recessed to facilitate the bending or folding under of the flaps 405 and 406 which is partially performed by lugs 391 and 394 of the levers 376 and 377, respectively; and the annular flange 286 is also further recessed to receive a cam 408 which is preferably formed integral with the cam 360 and which is securely fastened to the annular flange 286. The cam 408 is provided with a tapering cam groove 409 engageable with the flaps 405 and 406. When the table continues to be displaced, the flaps 405 and 406 ride into the tapering cam groove 409 and are bent upwardly underneath the piece of candy. The wrapped piece of candy then appears as it is shown in Fig. 40 and has this appearance when it is brought to rest over a plunger 410, (see Fig. 6) which is slidably journaled in the frame member 118 and is provided with a head 411 having a substantially flat surface 412 which normally forms a continuation of the upper surface of the annular flange 286, the annular flange 286 being provided with a recess 414 to accommodate the head 411. Projecting from the plunger 410 and riding in a slot 416 formed in the frame member 118 is a pin 420 which is pivoted by a pin 421 to one end of a link 422, the other end of the link 422 being pivoted by a pin 423 to one end of a lever 424 which carries an anti-friction roller 425 at its other end (see Fig. 6). A pin 426 pivotally connects the lever 424 to the bracket member 226. The plunger 410, the link 422 and the lever 424 are normally retained in the positions wherein they are shown in Fig. 6 by a tension spring 428 which has one of its ends secured to the pin 421 and has the other of its ends secured to a pin 430 that projects from the pedestal 40. The anti-friction roller 425 is engageable by the cam surface 233 and the portions 237 of this cam surface are adapted to displace the lever 424 in a clockwise direction (Fig. 6) against the action of the spring 428 so that the plunger 410 will be elevated to push the wrapped candy into a tubular member 433 which registers with the plunger 410 and is disposed thereabove. The wrapped candy frictionally engages the sides of the passage through the tubular member 433 and it is readily understood that when a plurality of pieces of candy are pushed into the passage, the candy will be fed upward through the tubular member until it passes through an arcuate portion 434 thereof into a substantially channel-shaped chute or guide 436 from which the candy may be readily removed (see Figs. 1 and 2).

In some instances, the initial piece of candy cut from a bar thereof by the blade 62 will be of such small dimensions that it and its paper will not come to rest upon the upper surface of the flange 286 but will fall or be pushed into the space surrounding the gear 141. Obviously, if no means is provided for discharging this candy and paper from the machine, the candy and paper will be caught between the gear 141 and the gear 143 with which the gear 141 meshes (see Fig. 12). To prevent the candy and paper from being caught between the gears 141 and 143, I preferably provide a plate 440 which is preferably clamped between the Geneva member 130 and the gear 141 (see Fig. 4).

Occasionally, either during the beginning of the operation of the machine or when completing a batch of candy, small pieces of candy or paper fall directly through the pockets in the rotor onto the plate 440, or first engage the flange 286 and thence are pushed therefrom onto the plate; and sometimes chips of the candy drop through the pockets and if the room is warm and the machine is not operating for a time, the chips become soft and adhere to the plate 440. Furthermore, it will be evident that at times a piece of candy is not of the required size and if it and a wrapper are forced into a pocket, the two are not firmly held in a position whereby the several mechanisms can properly fold the wrapper; and said wrapping mechanisms occasionally will cause the piece of candy and wrapper to become separated and either falls directly onto the plate 440 or is pushed from the flange 286.

And as best shown in Fig. 12, I preferably provide a deflecting or baffle plate 442 which projects into the frame member 118 through an aperture 444 formed in the wall thereof. The baffle or deflecting plate 442 is disposed above the plate 440 and is so arranged that when paper or candy drops upon the plate 440 and this plate is revolved with the gear 141, the deflecting or baffle plate 442 will guide the candy and paper out of the machine through the aperture 444.

The operation of the above described machine is substantially as follows: As explained above, the machine is driven by the electrical motor 42, or equivalent means for the purpose, and the driving mechanism of the machine is so designed that the table or rotor 140 is advanced intermittently, the rotor coming to rest five times during each complete revolution thereof. In a like manner, the cam 235 is rotated intermittently and comes to rest five times during each complete revolution thereof. The cam is provided with five portions 237 upon the cam surface 233 and these cam portions are adapted to actuate the mechanism for cutting the paper in which the candy is to be wrapped, the means for impaling the piece of paper upon the pins 247, means for driving the piece of candy and its associated piece of paper into one of the slots 253 when that slot is aligned with the slide 262, the means for actuating the mechanism carried by the slide 330 and the means for discharging the wrapped candy into the tubular member 433. Thus, when one of the portions 237 is displacing the slide 223 to actuate the paper cutting mechanism, other portions 237 are displacing the slides 262 and 330 and still another portion 237 is displacing the slide 410 to discharge a piece of wrapped candy from the machine. The driving mechanism of the machine is preferably so arranged that the cam 235 is at rest while the table 140 is advanced and the table or rotor 140 is at rest while the cam is being advanced.

The paper feeding mechanism feeds the paper intermittently, the arrangement being such that while each of the slots 253 is being moved to register beneath the slide 223, the paper is being advanced over the rotor or table 140 to register beneath the slide 223. When the rotor 140 and the paper-feeding mechanism are at rest the slide 223 is driven downwardly, thus cutting a piece of paper or the equivalent from the supply thereof and also impaling it upon a pair of pins 247 associated with that slot. Then while each slot 253 is being advanced to position beneath the slide 262, a piece of candy is being deposited to register beneath the slide 262. When the slot 253 with a piece of paper impaled upon the pins 247 associated with that slot, and the piece of candy are brought to register beneath the slide 262, the slide 262 then pushes the candy and paper into the slot 253 to rest upon the annular flange 286, thus the paper is partly wrapped around the piece of candy as illustrated in Fig. 34. The slot 253 with its partly wrapped candy is then advanced to the position wherein the paper is engaged by the lever 300 which folds one portion of the paper to provide the flap 305a shown in Fig. 35, the table 140 being at rest during this operation. Then when the table 140 is again advanced, a portion of the flap 304 shown in Figs. 34 and 35 is folded during the initial movement of the table 140 to provide the flap 304a shown in Fig. 36. The flaps 304a and 305a are retained in position by the arcuate member 327 during the travel of the table 140 and when the slot 253 comes to rest beneath the slide 330, the slide is driven downward by the action of one of the portions 237 so that the fingers 346 provided upon the levers 345 will fold portions of the flaps 304 and 305 into the positions wherein they are shown in Fig. 37 to provide the flap portions 304b, 304c, 305b and 305c. During the following displacement of the table 140 to bring the partly wrapped candy into the position from which it is discharged into the chute 433, the remaining steps of the wrapping operation are performed. Thus, the associated levers 374 and 375 fold the paper to provide the triangular flaps 305d and 305e and the associated levers 376 and 377 further fold the paper to give it the appearance illustrated in Fig. 39 and to provide the triangular flaps 405 and 406 which are subsequently folded into position by the cam 408. Of course, when the wrapped piece of candy comes to rest beneath the tubular member 433, one of the portions 237 of the cam 235 actuates the plunger 410 and the wrapped candy is driven into the tubular member.

The candy fed to the rolls 68, 69, 70 and 71 is generally in an irregularly shaped mass and the rolls cooperate with the members 100 to form the candy into a bar of substantially rectangular cross section, the bar is advanced continuously during the operation of the machine. The blade 62 of the combined cutting and conveying member 60 preferably cuts the bar of candy into pieces and deposits them into registry below the slide 262. As described above, the portion 103 of the blade 62 is adapted to advance the severed piece of candy faster than the bar is advanced so that the piece will not be engaged by the slide 262 when the slide is driven downward to push a piece of candy and its associated piece of paper into one of the slots 253.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. Wrapping apparatus comprising unitary means for cutting and feeding articles to a predetermined horizontal position, cam controlled means for feeding sheets of wrapping material to said position, means at said position for partially folding said sheets of wrapping material around said articles, means for advancing said partially folded sheets and said articles to a plurality of other positions, a plurality of means for performing other steps of the wrapping operation at said other positions, stationary means forming frictional contact with said articles to prevent downward movement of the same during the wrapping operation, means for discharging the wrapped articles from the apparatus, and cam means associated with said stationary means for completing the wrapping operation while the articles and sheets are in motion and are being displaced toward said discharging means.

2. Wrapping mechanism comprising a member having a plurality of pockets therein, means for feeding sheets of wrapping material to said pockets, means for intermittently rotating said member to bring said pockets successively into a plurality of predetermined positions, means for advancing articles to be wrapped to one of said positions, a reciprocatory member registering with said last-mentioned position for driving said sheets of paper and said articles into said pockets, a pivoted bracket slidably journaling said reciprocating member, means actuated by said article advancing means for angularly displacing said bracket around its pivotal axis, and means for wrapping said sheets around said articles while said sheets and said articles are in said pockets.

3. Wrapping apparatus comprising a rotatable member, means for feeding sheets of wrapping material to said rotatable member, helical means for continually cutting a bar into articles and feeding them to be wrapped to said rotatable member, means for intermittently rotating said rotatable member, means for wrapping said sheets around said articles while said sheets and said articles are being intermittently advanced with said member, tubular means disposed above said member and adapted to receive the wrapped articles, and means positioned beneath said member and said tubular means and adapted to displace the wrapped articles upwardly from said member into said tubular means.

4. Wrapping apparatus comprising a horizontally rotatable member having apertures formed therein apart from the periphery, means for intermittently advancing said member to bring said apertures into a plurality of predetermined positions, means for feeding sheets of wrapping material to the upper face of said member, unitary means for continually cutting a bar into articles and feeding them to be wrapped to said member, said last-mentioned means being adapted to deposit said articles upon said sheets, means at one of said positions for forcing said articles and said sheets into said apertures, means at another of said predetermined positions for partially folding said sheet of paper while said rotatable member is held against rotation, means at said last-mentioned position for folding other portions of said sheets when said rotatable member is being angularly displaced, and means for completing the wrapping operation while the sheets and said articles are positioned in said apertures, and means for ejecting and directing said wrapped articles upwardly and outwardly from said apparatus.

5. Wrapping apparatus comprising a rotatable member, means for feeding sheets of wrapping material to said member, means for feeding articles to be wrapped to said member, means for intermittently advancing said member to bring said sheets of paper and said articles into a plurality of predetermined positions, means at one of said positions for performing the first step of the wrapping operation, means at another of said positions for performing the second step of the wrapping operation, means for performing another wrapping operation, means at another of said positions for performing the fourth step of the wrapping operation, means for completing the wrapping operation while said articles and said sheets are being carried from one of said predetermined positions to another of said predetermined positions, means for discharging the wrapped articles from said member, and means including a cam for simultaneously actuating said discharging means and said means for performing the first and fourth steps of the wrapping operation.

6. Wrapping apparatus comprising a horizontal member having a plurality of pockets therein apart from the periphery, cam controlled means for feeding sheets of wrapping material to said pockets, means for positioning said sheets, means for holding the same after being positioned, helical means for feeding articles to said pockets, said last-mentioned means being adapted to deposit said articles upon said sheets, intermittently actuated means adapted to contact each article and correct its position on said sheets, means for performing the initial steps in wrapping said sheets around said articles, a reciprocatory slide, a plurality of levers pivoted to said slide and engageable with said sheets to perform one step of the wrapping operation, and means for completing the wrapping operation.

7. Wrapping mechanism comprising a member having a plurality of pockets therein apart from the periphery, means for feeding sheets of wrapping material to said pockets, means for intermittently rotating said member to bring said pockets successively into a plurality of predetermined positions, unitary means for cutting and advancing articles to be wrapped to one of said positions, a reciprocatory member registering with said last mentioned position for driving said sheets of paper and said articles into said pockets, means provided to prevent downward movement of said articles during the wrapping operations, a pivoted bracket slidably journaling said reciprocatory member, means actuated by said article advancing means for angularly displacing said bracket about its pivotal axis and means for wrapping said sheets around said articles while said sheets and said articles are in said pockets.

8. Wrapping apparatus comprising a movable member, means for feeding sheets of wrapping material to said movable member, helical means for continually cutting a bar into articles and feeding them to be wrapped to said rotatable member, means for periodically moving said movable member, means for folding said sheets around said articles while said sheets and said articles are being periodically advanced with said member, tubular means disposed adjacent said member and adapted to receive the wrapped articles, and means positioned beneath said member and said tubular means and adapted to displace the wrapped articles upwardly from said member into said tubular means.

9. Wrapping apparatus comprising a rotatable member, means for cutting sheets of material, means for feeding said sheets of wrapping material to said member, means for feeding articles to be wrapped to said member, means for intermittently advancing said member to bring said sheets of paper and said articles into a plurality of predetermined positions, vertically reciprocatory means at one of said positions for performing the first step of the wrapping operation, means pivotally connected above said rotatable member at another of said positions for performing the second step of the wrapping operation, means for performing another wrapping operation, means at another of said positions for performing the fourth step of the wrapping operation, a plurality of means pivotally connected to said rotatable member and movable therewith in the same plane for performing the fifth and sixth steps of the wrapping operation, means for completing the wrapping operation while said articles and said sheets are being carried from one of said predetermined positions to another of said predetermined positions, means for discharging the wrapped articles, and means including a cam for simultaneously actuating said discharging means and the members which perform the first and fourth steps of the wrapping operation.

10. Wrapping apparatus comprising a rotor member, means operated by a cam for cutting sheets of wrapping material, means for feeding said sheets of wrapping material to said rotor, helical tapering means for feeding articles to be wrapped to said rotor, means for periodically advancing said rotor to bring said sheets of paper and said articles into a plurality of predetermined positions, vertically reciprocatory means at one of said positions for performing the first step of the wrapping operation, means disposed above said rotor member and movable in a clockwise direction at another of said positions for performing the second step of the wrapping operation, beveled stationary means for performing another operation, means at another of said positions for performing the fourth step of the wrapping operation, a plurality of levers mounted on said rotor with fingers adapted to be intermittently actuated in a horizontal plane for performing respectively the fifth and sixth steps of the wrapping operation while said rotor is in motion, tapering groove means for completing the wrapping operation while said articles and said sheets are being carried from one of said predetermined positions to another of said predetermined positions, plunger means for discharging the wrapped articles upwardly from said rotor, and means including a cam which is disposed above said apparatus for simultaneously actuating said plunger means and said means for performing the first and fourth steps of the wrapping operation.

11. Wrapping apparatus comprising a frame supporting thereon and in combination therewith a rotatable member, means for feeding sheets of wrapping material to said member, means for feeding articles to be wrapped to said member, means for intermittently advancing said member to bring said sheets of paper and said articles into a plurality of predetermined positions, reciprocatory means at one of said positions for performing the first step of the wrapping operation, means at another of said positions for performing the second step of the wrapping operation, beveled means integral with the frame at another of said positions for performing the third step of the wrapping operation, a plurality of downwardly and outwardly movable means for performing the fourth step of the wrapping operation, a cam disposed on said frame near the periphery of said rotatable member, means movable on a vertical axis connected to the under side of said rotatable member and engageable with said cam means for performing the fifth and sixth step of the wrapping operation, tapering groove means for completing the wrapping while said articles and said sheets are being carried from one of said predetermined positions to another of said predetermined positions, means for discharging the wrapped articles from said member, and means including a cam for simultaneously actuating said discharging means and said means for performing the first and fourth steps of the wrapping operation.

12. Wrapping apparatus comprising a horizontal member having a plurality of pockets, means for feeding sheets of wrapping material to said pockets, means for holding said sheets in position, means comprising a substantial helical tapered member for cutting a bar of material into articles and advancing the same to said pockets, said last mentioned means being adapted to position said articles over said sheets, means for performing the initial steps in wrapping said sheets around said articles, a reciprocatory slide, a plurality of levers pivoted to said slide and engageable with said sheets to perform one step of the wrapping operation, and means for completing the wrapping operation.

13. Wrapping apparatus comprising means for advancing sheets of wrapping material to a predetermined position, means including a rotatable knife for cutting and advancing articles to said position, means including a single element spaced from said position for discharging the articles wrapped in said sheets from the apparatus, means positioned anteriorly of said discharging means for wrapping said articles in said sheets, means for advancing the sheets and articles from said predetermined position to said discharging means, and means for ejecting the articles and sheets of wrapping material which escape from said wrapping means.

14. Wrapping apparatus comprising means for advancing sheets of wrapping material to a predetermined position, means for advancing a bar of plastic material, means including a rotatable knife member for severing the bar into articles and delivering the severed articles longitudinally of the member to said position, means spaced from said position for discharging the articles wrapped in said sheets from the apparatus, means positioned anteriorly of said discharging means for wrapping said articles in said sheets, means for advancing the sheets and articles from said predetermined position to said discharging means, and means including a cam for operating said discharging means.

15. Wrapping apparatus comprising means for advancing sheets of wrapping material to a predetermined position, means for advancing a bar of plastic material, combined means including a tapered helical member for severing the bar into articles and delivering the severed articles to said position, means spaced from said position for vertically discharging the articles wrapped in said sheets from the apparatus, means positioned anteriorly of said discharging means for wrapping said articles in said sheets, and means for advancing the sheets and articles from said predetermined position to said discharging means.

16. Wrapping apparatus comprising means for advancing a strip of wrapping material to a predetermined position, means for severing said strip into sheets at said position, mean for advancing a bar of plastic material, helical means for severing the same and delivering the severed articles to said position, means spaced from said position for vertically discharging the articles wrapped in said sheets from the apparatus, means positioned anteriorly of said discharging means for wrapping said articles in said sheets, means for advancing said sheets and articles from said predetermined poition to said discharging means, means provided for ejecting the articles and sheets which escape said wrapping means, and means including a cam for controlling the operation of said strip severing means and said discharging means.

17. Wrapping apparatus comprising unitary means for cutting and feeding articles to a predetermined horizontal position, cam controlled means for feeding sheets of wrapping material to said position, means at said position for partially folding said sheets of wrapping material about said articles, means for advancing said partially folded sheets and said articles to a plurality of other positions, a plurality of means for performing other steps of the wrapping operation at said other positions, stationary means comprising a circular track forming frictional contact with said articles to prevent downward movement of the same during the wrapping operations, means for discharging the wrapped articles from the apparatus, cam means associated with said stationary means for completing the wrapping operation while the articles and sheets are in motion and are being displaced toward said discharging means, and means including a plate and a deflecting member for ejecting articles and sheets which escape the several wrapping means.

18. Wrapping apparatus comprising a frame, unitary means for cutting and feeding articles to a predetermined horizontal position, cam controlled means for feeding sheets of wrapping material to said position, plunger means at said position for partially folding said sheets of wrapping material about said articles, means for advancing said partially folded sheets and said articles to a plurality of other positions, a plurality of means for performing other steps of the wrapping operation at said other positions, stationary means arranged on said frame for forming frictional contact with said articles to prevent downward movement of the same during the wrapping operation, means for vertically discharging the wrapped articles from the apparatus, and means associated with said stationary means for completing the wrapping operation while the articles and sheets are in motion and are being displaced toward said discharging means, and means including a cam for timing and operating said plunger means.

19. Wrapping mechanism comprising a member having a plurality of pockets therein apart from its rim, means for feeding sheets of wrapping material to said pockets, means for positioning said sheets over said pockets, means for intermittently rotating said member to bring said pockets successively into a plurality of predetermined positions, combined means for cutting and advancing articles to be wrapped to one of said positions, a reciprocatory member registering with said last-mentioned position and operated by a cam for driving said sheets of paper and said articles into said pockets, a pivoted bracket slidably journaling said reciprocating member, means actuated by said article advancing means for angularly displacing said bracket about its pivotal axis, and means for wrapping said sheets about said articles while said sheets and articles are in said pockets.

20. Wrapping mechanism comprising a rotor having a plurality of pockets therein, cam controlled means manually operated for feeding sheets of wrapping material to said pockets, means for intermittently rotating said rotor to bring said pockets successively into a plurality of predetermined positions, means for advancing articles to be wrapped to one of said positions, means for positioning the articles over said sheets, a reciprocatory member registering with said last mentioned position for driving said sheets of wrapping material and said articles into said pockets, a pivoted bracket slidably journalling said reciprocating member, means actuated by said article advancing means for angularly displacing said bracket about its pivotal axis, means for wrapping said sheets about said articles while said sheets and said articles are in said pockets, means for discharging the wrapped articles and means including a circular undulated cam track for operating said reciprocatory member and said discharging means.

21. Wrapping apparatus comprising a rotatable member, means for cutting and feeding sheets of wrapping material to said rotatable member, helical means for continually cutting a bar into articles and feeding them to be wrapped to said rotatable member, means for positioning said article over said rotatable member, means for intermittently rotating said rotatable member, stationary means forming frictional contact with the articles and adapted to support same in said rotatable member, means for wrapping said sheets around said articles while said sheets and said articles are being intermittently advanced with said member, tubular means disposed above said member and adapted to receive the wrapped articles, and means positioned beneath said member and said tubular means and adapted to displace the wrapped articles upwardly from said member into said tubular means.

22. Wrapping apparatus comprising a rotatable member, cam controlled means operated by a lever for feeding sheets of wrapping material to said rotatable member, rotatable knife means for continually cutting a bar into articles and feeding them to be wrapped to said rotatable member, means for rotating said rotatable member, a plurality of means for wrapping said sheets about said articles while said sheets and said articles are being advanced with said member, tubular means disposed above said member and adapted to receive the wrapped articles, plunger means positioned beneath said member and tubular means and adapted to displace the wrapped articles upwardly from said member into said tubular means, and means including a cam for controlling the means for performing the first and fourth steps of the wrapping operation, and said plunger means.

23. Wrapping apparatus comprising a horizontally rotatable member having apertures formed therein apart from the periphery, means for intermittently advancing said member to bring said apertures into a plurality of predetermined positions, means for feeding sheets of wrapping material to the upper face of said member, unitary means for continually cutting a bar into articles and feeding them to be wrapped to said member, said last-mentioned means being adapted to deposit said articles over said sheets, means for positioning said articles on said sheets, means at one of said positions for forcing said articles and said sheets into said apertures, means at another of said predetermined positions for partially folding said sheets of paper while said rotatable member is held against rotation, means at said last-mentioned position for folding other portions of said sheets when said rotatable member is being angularly displaced, means for completing the wrapping operation while said sheets and said articles are positioned in said apertures, means for discharging the wrapped articles upwardly and outwardly from said apparatus, and means for ejecting articles which escape said apertures.

24. Wrapping apparatus comprising a horizontally rotatable member having apertures formed therein, means for intermittently advancing said member to bring said apertures into a plurality of predetermined positions, means for feeding sheets of wrapping material to the upper face of said member, means operated by a cam for positioning said sheets above said apertures, unitary means for continually cutting a bar into articles and feeding them to be wrapped to said member, said last-mentioned means being adapted to deposit said articles over said sheets, means at one of said positions for forcing said articles and said sheets into said apertures, means at another of said predetermined positions for partially folding said sheets of paper while said rotatable member is held against rotation, means at said last-mentioned position for folding other portions of said sheets when said rotatable member is being angularly displaced, and means comprising a grooved cam for completing the wrapping operation while the sheets and said articles are positioned in said apertures, and means for ejecting and directing said wrapped articles upwardly from said apparatus.

25. Wrapping apparatus comprising a rotatable member, means for cutting and feeding sheets of wrapping material to said member, combined means for cutting and feeding articles to be wrapped to said member, means for intermittently advancing said member to bring said sheets of paper and said articles into a plurality of predetermined positions, means operated by a circular undulated cam track at one of said positions for performing the first step of the wrapping operation, means operated by another cam at another of said positions for performing the second step of the wrapping operation, means for performing another wrapping operation, means at another of said positions for performing the fourth step of the wrapping operation, means for completing the wrapping operation while said articles and said sheets are being carried from one of said predetermined positions to another of said predetermined positions, means for discharging the wrapped articles from said member, and means including a cam for simultaneously actuating said discharging means and said means for performing the first and fourth steps of the wrapping operation.

26. Wrapping apparatus comprising a rotatable member, means for feeding sheets of wrapping material to said member, means for feeding articles to be wrapped to said member, means for intermittently advancing said member to bring said sheets of paper and said articles into a plurality of predetermined positions, means at one of said positions for performing the first step of the wrapping operation, means for performing several other steps of the wrapping operation, means comprising a grooved cam for completing the wrapping operation while said articles and said sheets are being carried from one of said predetermined positions to another of said predetermined positions, means for discharging the wrapped articles from said member, and means including a cam for simultaneously actuating said discharging means and said means for performing the first step of the wrapping operation.

27. Wrapping apparatus comprising a rotatable member, cam controlled means for feeding sheets of wrapping material to said member, means for forming a plastic mass of candy into a bar, helical means for cutting said bar into articles, and feeding said articles to be wrapped to said member, means for intermittently advancing said member to bring said sheets of paper and said articles into a plurality of predetermined positions, a plurality of means for performing the wrapping operations while said articles and said sheets are being carried to said predetermined positions, means for discharging the wrapped articles from said member, means including a cam for actuating said discharging means and means for ejecting articles and sheets which escape said wrapping means.

28. Wrapping mechanism comprising a member having a plurality of pockets therein, means for cutting and feeding sheets of wrapping material to said pockets, said cutting and feeding means controlled by a cam, means for intermittently rotating said member to bring said pockets successively into a plurality of predetermined positions, means for holding said sheets in a certain position over said pockets, unitary means for cutting and advancing articles to be wrapped to one of said positions, means including an L-shaped member for stopping and positioning the articles over said sheets, a reciprocatory member registering with said last-mentioned position for driving said sheets of wrapping material and said articles into said pockets, means provided to prevent downward movement of said articles during the wrapping operations, a pivoted bracket slidably journalling said reciprocatory member, means actuated by said article advancing means for angularly displacing said bracket about its pivotal axis, and means for wrapping said sheets about said articles while said sheets and said articles are in said pockets.

29. Wrapping mechanism comprising a member having a plurality of pockets therein apart from the periphery, means for feeding sheets of wrapping material to said pockets, means for intermittently rotating said member to bring said pockets successively into a plurality of predetermined positions, means including a curved knife for cutting and advancing articles to be wrapped to one of said positions, means for driving said sheets of wrapping material and said articles into said pockets, means comprising an upstanding annular flange provided to prevent downward movement of said articles during the wrapping operations, a pivoted bracket slidably journaling said driving means, means actuated by said article advancing means for angularly displacing said bracket about its pivotal axis, means for wrapping said sheets around said articles while said sheets and said articles are in said pockets, and means for discharging the wrapped articles from said pockets into a vertically disposed chute.

30. Wrapping apparatus comprising a frame, a movable member mounted on said frame, means for feeding sheets of wrapping material to said member, helical means for continually cutting a bar into articles and feeding them to be wrapped to said member, means for intermittently moving said member, means for folding said sheets about said articles while said sheets and said articles are being intermittently advanced with said member, tubular means disposed adjacent said member and adapted to receive the wrapped articles, and means positioned beneath said member in said frame and adapted to displace the wrapped articles upwardly from said member into said tubular means.

31. Wrapping apparatus comprising a movable member, means for feeding sheets of wrapping material to said movable member, curved knife means for continually cutting a bar into articles and feeding them to be wrapped to said rotatable member, means for periodically moving said movable member, means for folding said sheets about said articles while said sheets and said articles are being periodically advanced with said member, tubular means disposed adjacent said member and adapted to receive the wrapped articles, means including a cam operated plunger positioned beneath said member and said tubular means and adapted to displace the wrapped articles upwardly from said member into said tubular means, and means for ejecting the articles and sheets which escape said sheet folding means.

32. Wrapping apparatus comprising a rotatable member, means for feeding a strip of wrapping material to said member, means for cutting said wrapping material into sheets, means for feeding articles to be wrapped to said member, means for intermittently advancing said member to bring said sheets of wrapping material and said articles into a plurality of predetermined positions, vertically reciprocatory means at one of said positions for performing the first step of the wrapping operation, means pivotally connected above said rotatable member at another of said positions for performing the second step of the wrapping operation, stationary cam means arranged above the article for performing another wrapping operation, means for performing the fourth step of the wrapping operation, a plurality of levers periodically operable associated with said rotatable member and movable therewith in same plane for performing other steps of the wrapping operation, stationary cam means arranged below the articles for completing the wrapping operation, means for discharging the wrapped articles, and means including a cam for actuating said discharging means, said sheet cutting means, and said means for performing the first and fourth steps of the wrapping operation.

33. Wrapping apparatus comprising a frame supporting thereon and in combination therewith a rotatable member, means for feeding wrapping material to said member, means for severing said wrapping material into sheets, means for depositing said sheets on said member, combined means for cutting and feeding articles to be wrapped to said member, means for intermittently advancing said member to bring said sheets of wrapping material and said articles into a plurality of predetermined positions, reciprocatory means at one of said positions for performing the first step of the wrapping operation, means at another of said positions for performing the second step of the wrapping operation, beveled means integral with the frame at another of said positions for performing the third step of the wrapping operation, a plurality of downwardly and outwardly movable means for performing the fourth step of the wrapping operation, cams associated with said frame near said rotatable member, means movably connected to said rotatable member and engageable with said cams for performing the fifth and sixth steps of the wrapping operation, tapering groove means for completing the wrapping while said articles and said sheets are being carried from one of said predetermined positions to another of said predetermined positions, means for discharging the wrapped articles from said member, and means including a circular cam for simultaneously actuating said discharging means, said means for performing the first and fourth steps of the wrapping operation, said sheet severing means and said sheet depositing means.

34. Wrapping apparatus comprising a frame supporting thereon and in combination therewith a rotatable member, means for feeding wrapping material to said member, means for severing said wrapping material and feeding the same to said member, means for feeding articles to be wrapped to said member, means for intermittently advancing said member to bring said sheets of wrapping material and said articles into a plurality of predetermined positions, reciprocatory means at one of said positions for performing the first step of the wrapping operation, means at another of said positions for performing the second step of the wrapping operation, beveled means integral with the frame at another of said positions for performing the third step of the wrapping operation, a plurality of downwardly and outwardly movable means for performing the fourth step of the wrapping operation, a stationary cam disposed on said frame near the periphery of said rotatable member and another cam mounted within the frame, a plurality of lever means of which each is movable on a vertical axis connected to the underside of said rotatable member and operated by said cams for performing the fifth and sixth steps of the wrapping operation, tapering groove means for completing the wrapping while said articles and said sheets are being carried from one of said predetermined positions to another of said predetermined positions, means for discharging the wrapped articles from said member, and means including a circular cam for simultaneously actuating said discharging means, and said means for performing the first and fourth steps of the wrapping operation.

35. Wrapping apparatus comprising a frame, supporting thereon and in combination therewith a rotatable member, means for feeding sheets of wrapping material to said member, means for feeding articles to be wrapped to said member, means for positioning said articles over said sheets, means for intermittently advancing said member to bring said sheets of paper and said articles into a plurality of predetermined positions, reciprocatory means at one of said positions for performing the first step of the wrapping operation, lever means at another of said positions for performing the second step of the wrapping operation, beveled means integral with the frame near said lever means for performing the third step of the wrapping operation, a plurality of downwardly and outwardly movable means for performing the fourth step of the wrapping operation, stationary means disposed on said frame near said rotatable member, means movably connected to the under side of said rotatable member and engageable with said stationary means for performing the fifth and sixth steps of the wrapping operation, means for completing the wrapping while said articles and said sheets are being carried from one of said predetermined positions to another of said predetermined positions, means for discharging the wrapped articles from said member, means for ejecting articles and sheets which escape the several wrapping means, and means including a cam for simultaneously actuating said discharging means, and said means for performing the first and fourth steps of the wrapping operation.

36. Wrapping apparatus comprising a frame, supporting thereon and in combination therewith a rotatable member, means for feeding sheets of wrapping material to said member, means for feeding articles to be wrapped to said member, means for intermittently advancing said member to bring said sheets of paper and said articles into a plurality of predetermined positions, plunger means at one of said positions for performing the first step of the wrapping operation, means on said plunger means for positioning said articles on said sheets prior to the downward movement of said plunger, means at another of said positions for performing the second step of the wrapping operation, beveled means integral with the frame at another of said positions for performing the third step of the wrapping operation, a plurality of movable means for performing the fourth step of the wrapping operation, a cam disposed on said frame near the periphery of said rotatable member, means movably connected to the under side of said rotatable member and engageable with said cam means for performing the fifth and sixth steps of the wrapping operation, tapering groove means for completing the wrapping while said articles and said sheets are being carried from one of said predetermined positions to another of said predetermined positions, means for discharging the wrapped articles from said member, and means including a cam for simultaneously actuating said discharging means, and said means for performing the first and fourth steps of the wrapping operation.

37. Wrapping apparatus comprising a horizontal member having a plurality of pockets, means for feeding sheets of wrapping material to said pockets, means for holding said sheets in position, means comprising a helical tapered member for cutting a bar of material into articles and advancing the same to said pockets, means adapted to position said articles over said sheets, means for performing the initial steps in wrapping said sheets about said articles, a reciprocatory slide, means for preventing angular displacement of said slide, a plurality of levers pivoted to said slide and engageable with said sheets to perform one step of the wrapping operation, means for completing the wrapping operations and means including a cam for controlling and operating said slide.

38. Wrapping apparatus comprising a horizontal member having a plurality of pockets, means for feeding sheets of wrapping material to said pockets, means for holding said sheets in position over said pockets, means comprising a helical tapered member for cutting a bar of material into articles and advancing them to said pockets on said sheets, means for performing the initial steps in wrapping said sheets about said articles, a reciprocatory slide, a plurality of slotted levers pivoted to said slide, means arranged in said slots for angularly displacing said levers whereby said levers are engageable with said sheets to perform one step of the wrapping operation, means for completing the wrapping operations, and means for discharging the wrapped articles from the apparatus.

39. Wrapping apparatus comprising a rotatable member, means for feeding sheets of wrapping material to said rotatable member, helical means for cutting a bar into articles and feeding them to be wrapped to said rotatable member, means for intermittently rotating said rotatable member, a plurality of means for wrapping said sheets about said articles while they are associated with said member, means for discharging the wrapped articles from the apparatus, and means including an intermittently movable cylindrical cam for operating several of said wrapping means and the discharging means during the period when said rotatable member is at rest.

40. Wrapping apparatus comprising a rotatable member, means for feeding sheets of wrapping material to said rotatable member, helical means for continually cutting a bar into articles and advancing them to be wrapped to said rotatable member, said helical means having at its discharge end a portion with a greater lead than the remainder thereof whereby the articles being discharged therefrom are advanced at a faster rate of speed than the articles being cut, means for intermittently rotating said rotatable member, means for wrapping said sheets about said articles while said sheets and said articles are being intermittently advanced with said member, tubular means disposed above said member and adapted to receive the wrapped articles, and means positioned beneath said member for displacing the wrapped articles upwardly from the member into said tubular means.

41. Wrapping apparatus comprising a rotatable member, means for feeding sheets of wrapping material to said member, means for feeding articles to be wrapped to said member, means for intermittently advancing said member to bring said sheets of paper and said articles into a plurality of predetermined positions, plunger means at one of said positions for performing the first step of the wrapping operation, means at other positions for performing the second and third steps of the wrapping operation, means comprising a plurality of pairs of levers at another of said positions for performing the fourth and fifth steps of the wrapping operation, slide means having movable fingers associated therewith for performing the sixth step of the wrapping operation, means for completing the wrapping operation while said articles and said sheets are being carried from one of said predetermined positions to another of said predetermined positions, means for discharging the wrapped articles from said member, and means including a cam for simultaneously actuating said discharging means and said means for performing the first and sixth steps of the wrapping operation.

42. Wrapping apparatus comprising a frame, a table member rotatably mounted upon said frame, said table being provided with a plurality of pockets, cam controlled means for feeding sheets of wrapping material to said pockets, means including a rotatable helical member mounted on a horizontal axis for cutting and feeding articles to said pockets, means adapted to position said articles on said sheets, means for forcing said articles and said sheets into said pockets for partially folding said sheets about said articles, means for completely wrapping said sheets around said articles while said articles are in said pockets, means for discharging the wrapped articles vertically from said table member, and means disposed within said frame for ejecting articles which escape from said pockets during the wrapping operations.

43. Wrapping apparatus comprising a frame, a table member provided with pockets supported by said frame, means for feeding sheets of wrapping material to said pockets of said table member, means for feeding articles to said pockets, means for performing the first wrapping operation, means pivoted above said table member and movable in a clockwise direction for performing the second wrapping operation, beveled stationary means mounted on said frame for performing the third wrapping operation, means for performing the fourth wrapping operation, means comprising two sets of levers arranged between the pockets, means for intermittently actuating each pair of levers for performing respectively the fifth and sixth steps of the wrapping operation, tapering groove means disposed below said table member for completing the wrapping operation, means for discharging the wrapped articles upwardly, and means provided for simultaneously operating said discharging means and said means for performing the first and fourth steps of the wrapping operations.

44. Wrapping apparatus comprising a frame, a table rotatably mounted upon said frame, said table being provided with a plurality of pockets set in from its rim, means for feeding sheets of wrapping material to said pockets, means comprising a knife for cutting and feeding articles to said pockets, means adapted to position said articles over said sheets, means for performing the first step of the wrapping operation, a plurality of other means for wrapping said sheets about said articles while said articles are in said pockets, means for discharging the wrapped articles from said table member, means including a cam for operating the means for performing said first step of the wrapping operation, and means disposed within said frame for ejecting articles and sheets which escape from said pockets during the wrapping operations.

45. A machine of the kind described, including in combination, a wrapping means, and an apparatus for forming articles from plastic material, said apparatus comprising a pair of spaced rolls rotatable around parallel axes of rotation, a second pair of spaced rolls rotatable around axes of rotation normal to the first-mentioned axes of rotation and in substantially the same plane, the peripheries of said first and second pair of rolls being arranged to engage said material and advance it between them, means for driving said rolls, and helical means operating in synchronism with said rolls for cutting said material into articles after leaving the rolls and delivering the articles to said wrapping means.

46. Wrapping apparatus comprising a frame, a table rotatably mounted upon said frame, said table being provided with a plurality of pockets, means for feeding sheets of material to said pockets, means for feeding articles to said pockets, said last-mentioned means being adapted to deposit said articles upon said sheets, means for wrapping said sheets about said articles while said articles are in said pockets, means for discharging the wrapped articles from said rotatable member, and means disposed within said frame for ejecting articles which escape from said pockets during the wrapping operations.

47. In a machine of the kind described wherein there is provided wrapping means and means for forming a mass of plastic material into a bar and conveying the bar in the direction of the wrapping means, the combination of means consisting of a single rotatable element operable in synchronism with said forming and conveying means for simultaneously cutting the bar into articles and feeding the articles to said wrapping means, said cutting and feeding means also being of a character whereby the articles being discharged therefrom to said wrapping means are advanced at a faster rate of speed than the articles being cut.

48. In a machine of the kind described wherein wrapping means and means are provided comprising a plurality of rolls for forming a mass of plastic material into a bar and conveying the bar in the direction of said wrapping means, the combination of means comprising a helical element rotatable on a horizontal axis operable in synchronism with said forming and conveying means providing means for simultaneously cutting the bar into articles as the bar is conveyed and feeding the articles directly to said wrapping means.

49. In a machine of the kind described wherein wrapping means and means are provided comprising a plurality of rolls for forming a mass of plastic material into a bar and conveying the bar in the direction of said wrapping means, the combination of means comprising a helical element rotatable on a horizontal axis operable in synchronism with said forming and conveying means providing means for simultaneously cutting the bar into articles and feeding the articles directly to said wrapping means, said cutting and feeding means also being of a character whereby the articles being discharged therefrom to said wrapping means are advanced at a faster rate of speed than the articles being cut.

50. In a machine of the kind described wherein wrapping means and means are provided for forming a mass of plastic material into a bar and conveying the bar in the direction of the wrapping means, the combination of helical means operable in synchronism with said forming and conveying means and said wrapping means providing means for simultaneously cutting the bar into articles and feeding the articles in the same direction the bar is conveyed to said wrapping means.

51. In a machine of the kind described wherein wrapping means and means are provided for forming a mass of plastic material into a bar and conveying the bar in the direction of the wrapping means, the combination of means operable in synchronism with said forming and conveying means for simultaneously cutting the bar into articles and feeding the articles to said wrapping means, said cutting and feeding means comprising a helical member terminating at its discharge end in a portion having a greater lead than the remainder thereof whereby the articles being discharged from the member to the wrapping means are advanced at a faster rate of speed than the articles being cut.

52. In a machine of the kind described wherein wrapping means and means comprisng a plurality of rolls are provided for forming a mass of plastic material into a bar and conveying the bar in the direction of said wrapping means, the combination of means rotatable on a horizontal axis operable in conjunction with said forming and conveying means providing means for simultaneously cutting the bar into articles and feeding the articles directly to said wrapping means, said cutting and feeding means comprising a helical member terminating at its discharge end in a portion having a greater lead than the remainder thereof whereby the articles being discharged therefrom to the wrapping means are advanced at a faster rate of speed than the articles being cut.

53. In a machine of the kind described wherein wrapping means and means are provided for forming a mass of plastic material into a bar and conveying the bar in the direction of said wrapping means, the combination of means operable in conjunction with said forming and conveying means providing means for simultaneously cutting the bar into articles and feeding the articles in the direction the bar is conveyed to said wrapping means, said cutting and feeding means including a helical member terminating at its discharge end in a portion having a greater lead than the remainder thereof whereby the articles being discharged therefrom to the wrapping means are advanced at a faster rate of speed than the articles being cut.

54. In a machine of the kind described wherein means for wrapping articles and means are provided for feeding wrapping material to the wrapping means and means are provided for forming the material of which the articles are made into a bar and conveying the bar in the direction of the wrapping means, the combination of means comprising a helical element which is of a character to simultaneously cut the bar into articles and feed the articles to said wrapping means.

55. In a machine of the kind described wherein means for wrapping articles and means are provided for feeding wrapping material over an arcuate support to the wrapping means and means are provided for forming the material of which the articles are made into a bar and conveying the bar in the direction of the wrapping means, the combination of means comprising a helical element which is of a character to simultaneously cut the bar into articles and feed the articles to said wrapping means.

56. In a machine of the kind described wherein wrapping means and means are provided for forming a material into a bar, the combination of means comprising a helical element for simultaneously cutting the bar into articles and feeding the articles to said wrapping means.

57. In a machine of the kind described wherein wrapping means and means are provided for forming a material into a bar, the combination of means comprising a helical element of a character for simultaneously cutting the bar into articles and feeding the articles to said wrapping means, and means for discharging the wrapped articles from the machine, and means including a cam for controlling the operation of said discharging means.

58. In a machine of the kind described, including in combination wrapping means, an apparatus for forming articles from plastic material, said apparatus comprising a pair of spaced rolls rotatable around parallel axes of rotation, a second pair of spaced rolls rotatable around axes of rotation normal to the first-mentioned axes of rotation and in substantially the same plane, the peripheries of said first and second pair of rolls being arranged to engage said material and advance it between them, means for driving said rolls and means operable in synchronism with said rolls for simultaneously cutting said material into articles after leaving the rolls and feeding the articles to said wrapping means, said cutting and feeding means being of a character whereby the articles being discharged therefrom to said wrapping means are advanced at a faster rate of speed than the articles being cut.

59. In a machine of the kind described wherein means are provided for conveying wrapping material over an arcuate support to a predetermined position and means are provided for cutting the material into sheets, the combination of means comprising a helical element of a character for simultaneously cutting a bar of material into articles and feeding the articles to said position, means for wrapping said sheets about said articles, means for discharging the wrapped articles and means including a cam for controlling the operation of said sheet cutting means and said discharging means.

60. In a machine of the kind described wherein wrapping means and means are provided for forming a material into a bar, the combination of a single rotatable element for cutting the bar into articles and of a character to simultaneously feed the articles longitudinally thereof to said wrapping means.

RUDOLPH T. ECKLUND.